United States Patent [19]

Fandrianto et al.

[11] Patent Number: 5,379,351
[45] Date of Patent: Jan. 3, 1995

[54] VIDEO COMPRESSION/DECOMPRESSION PROCESSING AND PROCESSORS

[75] Inventors: Jan Fandrianto, Los Gatos; Chi S. Wang, Los Altos; Sehat Sutardja, Cupertino; Hedley K. J. Rainnie; Bryan R. Martin, both of Santa Clara, all of Calif.

[73] Assignee: Integrated Information Technology, Inc., Santa Clara, Calif.

[21] Appl. No.: 838,382

[22] Filed: Feb. 19, 1992

[51] Int. Cl.$^6$ .............................................. G06K 9/36
[52] U.S. Cl. ....................................... 382/41; 382/56; 358/432
[58] Field of Search ..................... 382/41, 56; 348/400, 348/407, 413, 415, 417; 358/432; 364/900, 723, 724.01, 724.16, 725, 726; H04N 7/12, 7/13, 7/133, 1/137; G06K 9/36, 9/46; G06F 1/00, 7/00, 7/38, 15/00, 15/31/15/40

[56] References Cited

U.S. PATENT DOCUMENTS

| | | | |
|---|---|---|---|
| 4,472,788 | 9/1984 | Yamazaki | 364/900 |
| 4,495,598 | 1/1985 | Vahlstrom et al. | 364/900 |
| 4,752,905 | 6/1988 | Nakagawa et al. | 364/760 |
| 4,811,268 | 3/1989 | Nishitani et al. | 364/745 |
| 4,894,794 | 1/1990 | Shenk | 364/723 |
| 4,951,244 | 8/1990 | Meyer | 364/723 |
| 4,953,115 | 8/1990 | Kanoh | 364/715.01 |
| 5,150,322 | 9/1992 | Smith et al. | 364/760 |
| 5,179,531 | 1/1993 | Yamaki | 364/736 |
| 5,181,183 | 1/1993 | Miyazaki | 364/725 |
| 5,189,526 | 2/1993 | Sasson | 358/432 |
| 5,196,946 | 3/1993 | Backanski et al. | 382/56 |

FOREIGN PATENT DOCUMENTS

| | | | |
|---|---|---|---|
| 0202633A1 | 11/1986 | European Pat. Off. | G06F 7/544 |
| 0377994A3 | 7/1990 | European Pat. Off. | G06F 7/48 |

OTHER PUBLICATIONS

E. D. N. Electrical Design News, vol. 32, No. 12, 11 Jun. 1987, Newton, Mass., pp. 115–126, Titus "CHIPS".

*Primary Examiner*—Jose L. Couso
*Attorney, Agent, or Firm*—Skjerven, Morrill, MacPherson, Franklin & Friel

[57] ABSTRACT

A vision processor includes a control section, a motion estimation section, and a discrete cosine transform ("DCT") section. The motion estimation section includes two memories, an image memory with two read ports and a write port, and a search memory with two read ports and a write port. The DCT section includes a DCT memory configurable as a two read, two write port memory and as a four read, four write port memory. The ports of these memories are selectively applied to various elements in the motion estimation path and the DCT path. In motion vector searching, the ALU performs averaging and difference operations on pixels in the frame and search memories. Data from the search memory is shifted for certain operations, before arithmetic operations in the ALU are performed. In DCT operations, transposition is done on word data read from the DCT memory in a shifter/transposer, which is shared with the motion estimation section, and the results written back to the DCT memory through the ALU operating in pass through mode. Multiply-accumulate operations are done in a multiplier-accumulator, which reads and writes-back to the DCT memory. Data transfers from the frame and search memories to the DCT memory may be performed in parallel with multiply-accumulate operations.

9 Claims, 20 Drawing Sheets

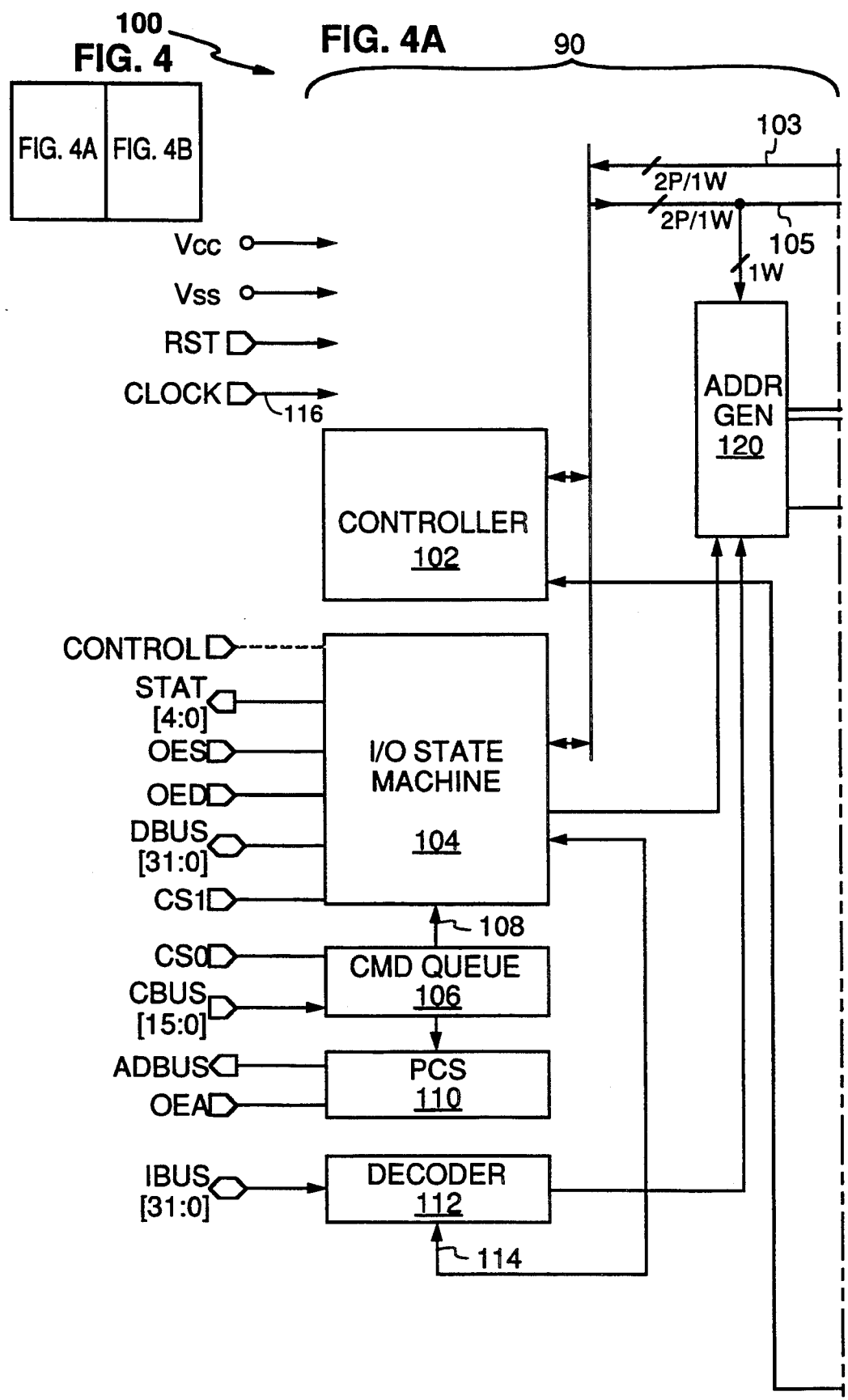

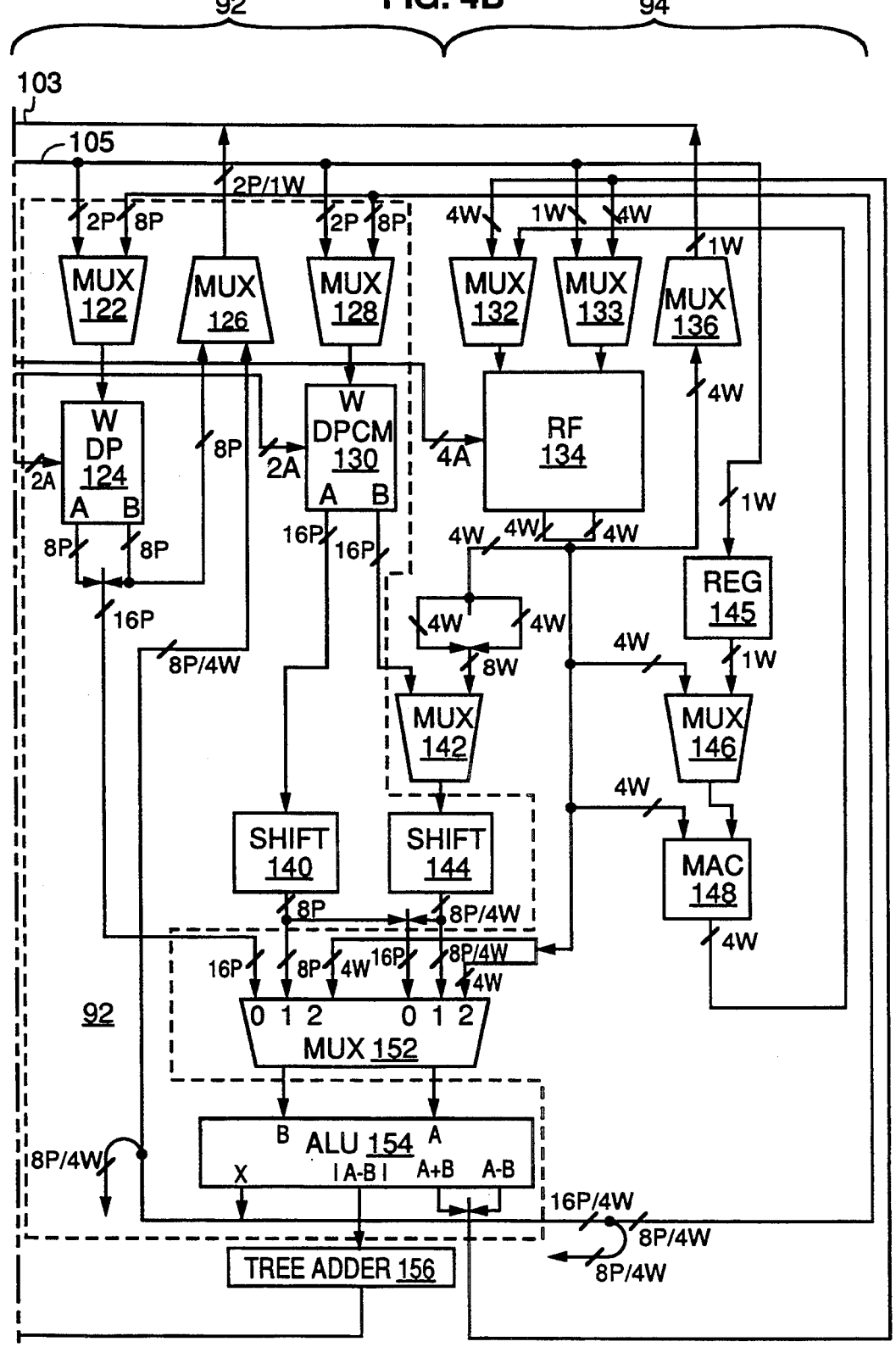

VIDEO COMPRESSION/DECOMPRESSION PROCESSING AND PROCESSORS

CROSS-REFERENCE TO RELATED APPLICATIONS

This application is related to a copending application of Fandrianto et al. entitled "Programmable Architecture and Methods for Motion Estimation," attorney docket number M-1916 US, filed on even date herewith, which is hereby incorporated herein by reference in its entirety.

BACKGROUND

1. Field of the Invention

The present invention relates to video compression/decompression processing and processors, and more specifically to a programmable architecture and related methods for video signal processing using the discrete cosine transform and motion estimation.

2. Description of Related Art

Applications such as video telephone, digital television, and interactive multimedia using such digital storage technology as CD-ROM, digital audio tape, and magnetic disk require digital video coding, or video compression, to achieve the necessary high data transfer rates over relatively low bandwidth channels. Various standards have been proposed for video coding. A standard for the storage and transmission of still images has been adopted by the International Standards Organization ("ISO"), Joint Photographic Expert Group ("JPEC"); see "JPEC Technical Specification, Revision 5, "JPEG-8-R5, January 1980. A standard for digital television broadcast coding at 30/45 Mb/s is under consideration; see CCIR-CMTT/2, "Digital Transmission of Component-Coded Television Signals at 30-34 Mb/s and 45 Mb/s Using the Discrete Cosine Transform," Document CMTT/2-55. A standard for video telephony and video conferencing at 64 to 1920 kb/s has been adopted by the International Consultative Committee for Telephone and Telegraph ("CCITT"); see "Draft Revision of Recommendation H.261," Document 572, CCITT SG XV, Working Party XV/1, Spec. Grp. on Coding for Visual Telephony. A standard for storage applications below 1.5 Mb/s, which are similar to the applications targeted by the CCITT standard, is under consideration by the Moving Picture Experts Group ("MPEG") of the ISO. Video coding algorithms have been proposed as contributions to the standardization activity of ISO/MPEG; see Wong et al , "MCPIC: A Video Coding Algorithm for Transmission and Storage Applications," IEEE Communications Magazine, November 1990, pp. 24–32.

The Motion-Compensated Predictive/Interpolative Coding ("MCPIC") proposed by Wong et al. is reasonably compatible with the CCITT standard, as the basic algorithm is a predictive transform coding loop with motion compensation. MCPIC provides greater flexibility, however. The basic algorithm is used to code every second frame of the source video, while the intervening frames are coded with motion-compensated interpolation and additional discrete cosine transform coding of the interpolation error. Accuracy in motion estimation is ½ pixel. Other capabilities of the MCPIC algorithm include frequent periodic reset of the temporal predictor, an optional provision of adaptive Huffman code tables for digital storage media-based applications, and an optimal quantization matrix according to the JPEG standard.

In summary, continuous-tone still image applications are addressed by the JPEG standard, teleconferencing is addressed by the Px64 standard, and full-motion video is addressed by the MPEG standard. An application such as interactive multimedia running on a personal computer or workstation may well require implementations of some or all of these compression techniques, as well as other techniques for voice mail and annotation and for lossless data compression of arbitrary binary files to be stored to disk or communicated to other computers. Moreover, new compression algorithms and modifications of current compression algorithms will be developed. Different compression algorithms have different resolution, bandwidth, and frame rate requirements, which are best accommodated by a programmable vision processor rather than a multitude of separate, dedicated vision processors for each function.

While building block implementations of vision processors have met with some success, a need has arisen for a programmable, high performance, and low cost digital signal processing architecture suitable for stand alone use in image and video discrete cosine transform ("DCT")-based compression and/or decompression systems. Programmability is desirable because of the wish to accommodate a variety of different existing algorithms, custom versions of existing algorithms, and future algorithms. High performance and low cost are desirable because of the price-performance demands of the highly competitive marketplace in which digital signal processing devices are sold.

SUMMARY OF THE INVENTION

The present invention is advantageous in many respects. For example, the programmability of the present invention enables support of custom modifications of existing vision processing algorithms and of future new algorithms, and allows the addition of customer-proprietary optimizations and algorithms. The highly integrated nature of the present invention makes possible a high level of performance at low cost.

In one embodiment of the invention, digitized video data are compressed or decompressed using the discrete cosine function. Data derived from the video data are stored in a memory, and are processed in an operation such as addition, subtraction, multiplication, accumulation, scaling, rounding, normalization or transposition. The operation is part of a discrete cosine transform, quantization, mode decision parametric, or filter calculation. Concurrently with this processing step, other data comprising pixels of the video data are transferred to another memory. This data are processed in an operation such as addition, subtraction, and averaging, which is part of a motion calculation.

In one embodiment of the present invention, a multiplier-accumulator includes a multiplier receiving the numeric quantities, two shift registers coupled to the sum and carry outputs of the multiplier, an accumulator, an adder receiving inputs from the shift registers and the accumulator, another shift register at the output of the adder. The output of the third shift register is routed back to the accumulator.

In another embodiment of the present invention, a shifter/transposer includes two multiplexers, each having two sets of inputs receiving two groups of binary data. The two groups of binary data applied to the first sets of inputs of the multiplexers are related in that one is a transposed arrangement of the other. The two groups of binary data applied to the second sets of inputs of the multiplexers are related in that they are both progressive subsets of a group of binary data.

In another embodiment of the present invention, an arithmetic logic unit for processing operandi representing pixel data and discrete cosine transform data in the data path of a vision processor to provide sum, difference, average, and absolute difference results from said operandi includes an adder and a divide-by-two circuit coupled to the adder and furnishing an average of the operandi. The ALU also includes a subtractor with two outputs, one furnishing a difference of the operandi and the other furnishing a difference of the operandi plus one. The difference plus one output is applied to an inverter. A multiplexer driven by the sign bit of the difference output selects between the difference output and the output of the inverter, for furnishing an absolute value of the operandi.

In another embodiment of the present invention, an apparatus for transposing data in a two dimensional discrete cosine transform calculation includes a memory having a plurality of separately addressable banks, each having an input and an output and being readable and writable in the same address cycle. The inputs of a parallel transpose circuit are coupled to the outputs of the banks of said memory, and the outputs are coupled to the inputs of the memory.

In another embodiment of the invention, an apparatus for performing multiplications and accumulations for a two dimensional discrete cosine transform calculation includes a memory having a plurality of jointly addressable banks, each having an input and two outputs and being readable and writable in the same address cycle. The inputs of a plurality of multiplier-accumulator units are coupled to the outputs of the banks of said memory, and their outputs are coupled to the inputs of the memory.

BRIEF DESCRIPTION OF THE DRAWINGS

In the Figures, where like reference numerals indicate like parts,

FIGS. 4, 4A–4B are a block diagram showing the architecture of a vision processor in accordance with the present invention;

FIGS. 10, 10A–D block schematic diagrams of a funnel shifter and transposer useful in the datapath of the vision processor of FIG. 4.

DETAILED DESCRIPTION OF THE PREFERRED AND OTHER EMBODIMENTS

A vision processor 100 as that shown in FIG. 4 is useful in, for example, image and video DCT-based compression/decompression systems. The vision processor 100 is microcode-based, or more generally speaking programmable, so that it may be configured in a variety of adopted and proposed international standards for video image compression or multimedia applications. Suitable applications include picture phones, teleconferencing equipment, CD-ROM equipment, movie decoders, video tape recorders, EDTV, and HDTV.

Figure 1:
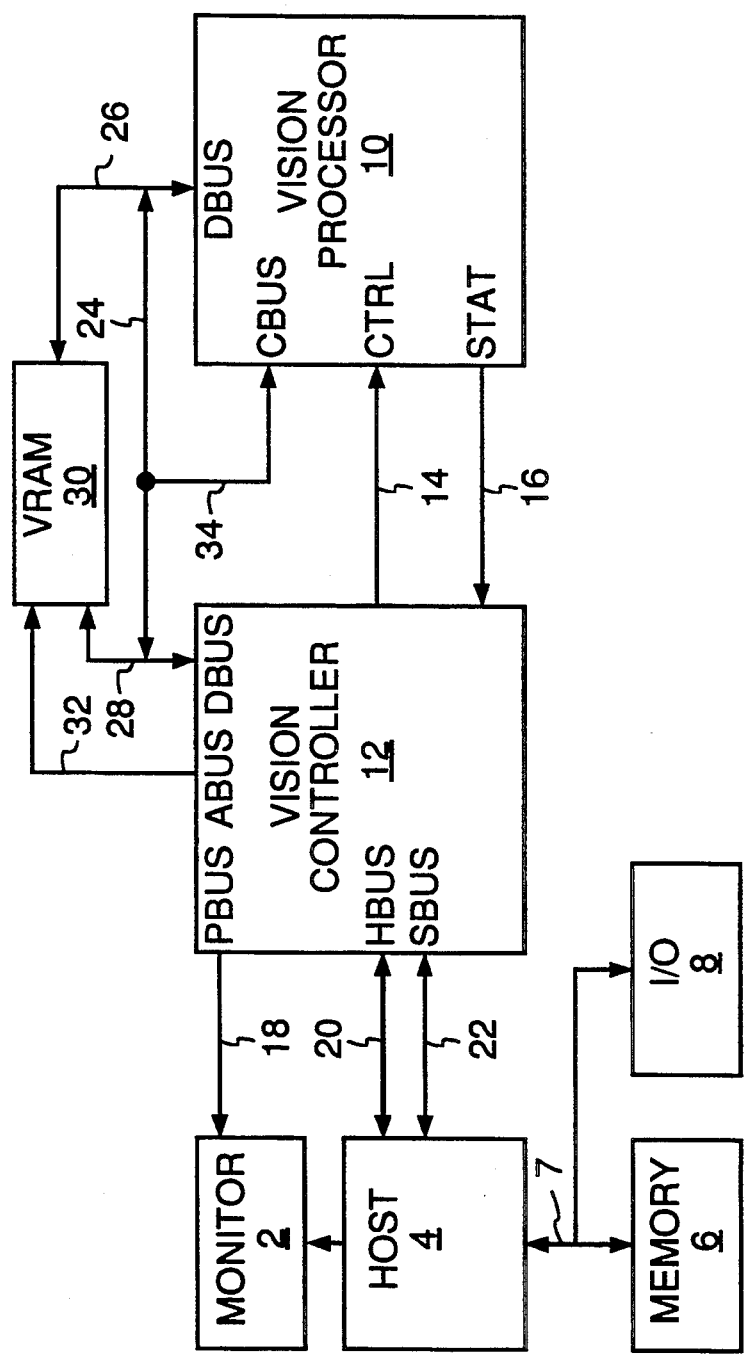
FIG. 1 is a block diagram showing an application of a vision processor in an encoding/decoding system.

FIG. 1 shows an application in which vision processor 10, which is similar to vision processor 100, is used in either encoding a picture or decoding a previously compressed picture. The encoding and decoding are done using a suitable standard, such as the MCPIC standard disclosed in the aforementioned Wong et al. article, which is hereby incorporated herein by reference. The host computer 4, a suitable personal computer or workstation, for example, is connected to a suitable monitor 2 by a suitable connector, and to a suitable memory 6 and a suitable input/output device 8 over an address/data bus 7. The memory 6 may be a large and moderately fast memory such as a hard disk. The I/O device 8 may be, for example, a satellite transceiver, a telephone transceiver, a compact disk unit, a hard disk unit, a frame grabber camera, or any desired combination of individual I/O devices. A suitable controller 12 is connected at its HBUS terminal to the host computer 4 over host bus 20, at its SBUS terminal to sync bus 22, and at its PBUS terminal to the monitor 2 over pixel bus 18. Controller 12 is further connected to a vision processor 10 over control bus 14 and status bus 16. The respective data bus ports DBUS of vision processor 10 and vision controller 12 are directly connected to one another by data bus 24, and to respective ports of a random access memory 30, which may be a video RAM ("VRAM") or an appropriately configured standard DRAM memory, by respective data buses 28 and 26. The random access memory 30 functions as a memory for vision processor code and data, as well as a reference memory for the controller. VRAM 30 also receives address information from the ABUS terminal of controller 12 over address bus 32. The CBUS input of the vision processor 10 is connected to the data bus 24 over command bus 34.

The decoding/encode system of FIG. 1 operates as follows. In a decoding operation, the host computer 4 receives a Huffman coded (variable length) compressed YUV signal from the I/O device 8 or from memory 6 and furnishes the signal to the controller 12. The variable length signal is converted by controller 12 into a fixed length signal using any suitable technique such as a lookup table. The fixed length signal is furnished to VRAM 30 via the host bus 20 and data bus 28. Under control of the controller 12 over control bus 14, vision processor 10 converts the compressed data into uncompressed data, which is stored in VRAM 30. Various commands are furnished as necessary to the vision processor 10 by the controller over command bus 34. The status of the vision processor 10 is monitored by controller 12 over status bus 16. The controller 12 converts the uncompressed data from YUV format to RGB format, and drives the pixel data out over the pixel bus 18 to the monitor 2. Of course, the uncompressed data may be used in other generally well known ways as well.

In an encoding operation, the uncompressed video data from I/O device 8, which may be, for example, a frame grabber camera, is furnished to controller 12 by the host 4. The controller 12 performs some preprocessing, converting the data, typically but not necessarily in the RGB format, to a common YUV standard, and stores the converted data in VRAM 30.

In some encoding applications, a video source signal is furnished either from memory 6 or I/O device 8 in a format not suitable for direct use by the controller 12. Depending on the compression algorithm to be implemented by the vision processor 100, additional preprocessing of the video source signal may be necessary. For example, a digital format such as CCIR 601 4:2:2, a standard of the International Radio Consultative Committee, is an interlaced format with 720×240 pixels/field. The MCPIC compression algorithm, however, operates on the Common Intermediate Format ("CIF"), which is a progressively scanned format at 30 frames/second, each frame having 352×240 samples for the luminance (Y) and 176×120 samples for the two chrominances (U, V). The CCIR 601 source video signal must be converted from its interlace format to the progressive format of the CIF signal. This conversion is done in the host 4, suitably programmed, and the results stored in memory 6 or furnished to controller 12, as desired. A suitable technique for making this conversion is described in the above-referenced Wong article.

Under control of the controller 12 over control bus 14, vision processor 10 converts the uncompressed data into compressed data. Various commands are furnished as necessary to the vision processor 10 by the controller over command bus 34. The status of the vision processor 10 is monitored by controller 12 over status bus 16. The compressed data is furnished directly to controller 12 over data bus 24, in which it is converted to a variable length format using Huffman decoding, for example. The variable length encoded data is furnished to host 4 over host bus 20, from which it is directed to memory 6 or the I/O device 8 as appropriate.

Figure 2:
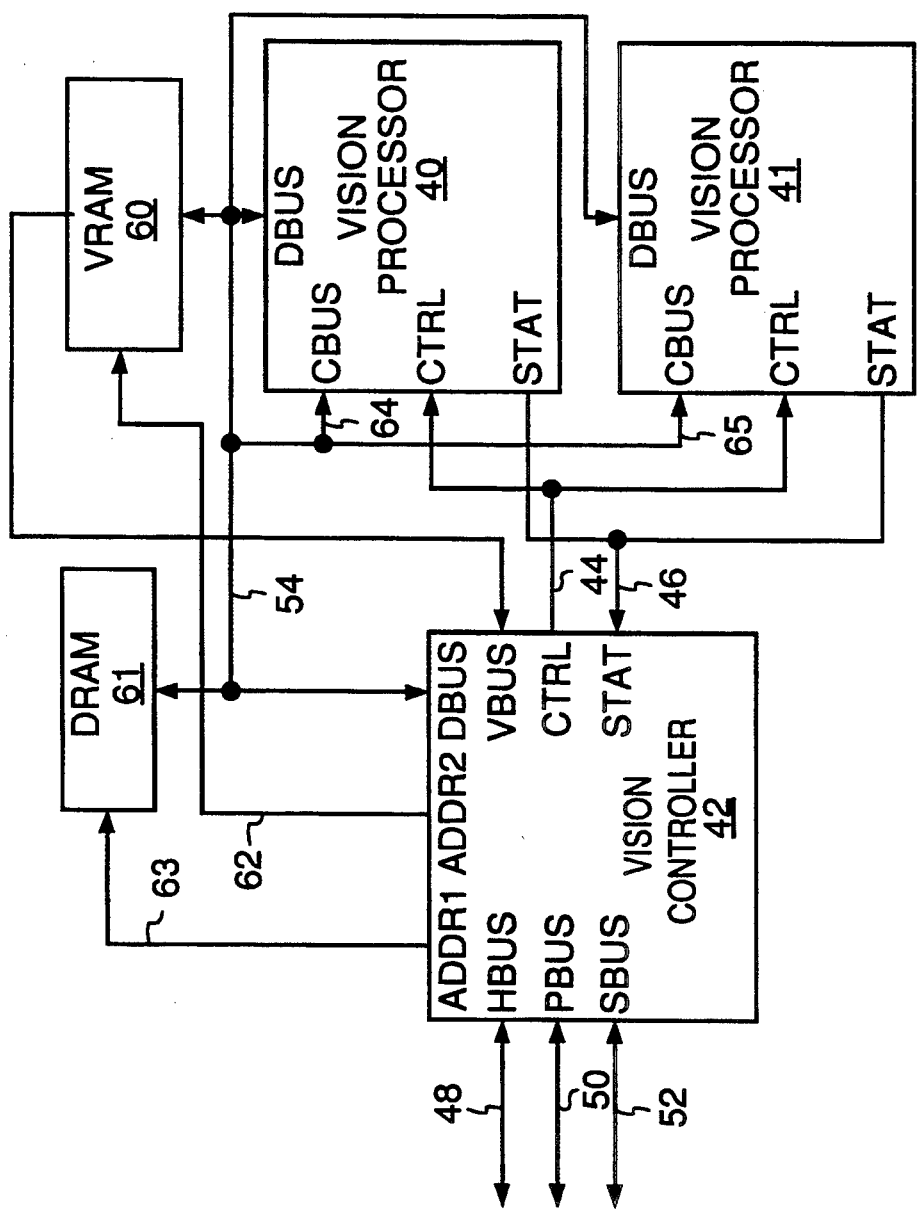
FIG. 2 is a block diagram showing an application of two vision processors in an encoding/decoding system.

FIG. 2 shows an application in which vision processors 40 and 41, which are similar to vision processor 100, are used in either a complete encoder PX64 CCITT teleconferencing system with full CIF resolution or in an H.261 teleconferencing system. The vision processors 40 and 41 are connected to a vision controller 42 by a control line 44 and a status line 46. The vision controller 42 in turn is connected to the host (not shown) by host bus 48, pixel bus 50, and sync bus 52. The respective data bus ports DBUS of the vision processors 40 and 41 and the vision controller 42 are connected to one another by data bus 54, and to respectively a parallel data port on VRAM 60 functioning as a vision controller reference memory, and a data port on DRAM memory 61 functioning as storage for vision processor code and data. The serial port of the VRAM 60 is connected to a video serial-in port VBUS of the vision controller 42. Both VRAM 60 and DRAM 61 receive address information from the vision controller 42 over respective address buses 62 and 63. The data bus ports DBUS of vision processor 41 is also connected to the respective command bus CBUS ports of the vision processors 40 and 41 by command buses 64 and 65.

The teleconferencing system of FIG. 2 operates essentially as described for the FIG. 1 system, except that the use of multiple vision processors such as 40 and 41 connected in parallel allow the processing of a large amount of data in parallel, thereby enabling encoding and decoding for high resolution systems.

Vision Processor Architecture

An illustrative programmable architecture 100 for implementing video signal processing based on the discrete cosine transform is shown in FIG. 4. The vision processor 10 in FIG. 1 and the vision processors 40 and 42 in FIG. 2 utilize the architecture 100. Preferably, the functionality represented by FIG. 4 is provided on the same chip with a high level of integration, as compared to building block implementations, in order to minimize data path delays and power consumption. Suitable fabrication technologies include one micron CMOS.

The vision processor architecture 100 comprises three sections, a control section generally indicated at 90, a motion estimation section generally indicated at 92, and a discrete cosine transform ("DCT") section generally indicated at 94. The control section 90 controls the operations of both the motion estimation section 92 and the DCT section 94. The motion estimation section 92 determines a motion vector displacement and prediction error for the search block within a search window that most closely matches an image block. The terms "motion estimations," "motion compensation," and "motion prediction" are used interchangeably. The DCT section 94 is particularly effective in executing DCT, inverse DCT, quantization, and inverse quantization operations. The purpose of the discrete cosine transform is to transform a signal in the spatial domain to a signal in the frequency domain, comprising coefficients representing intensity as a function of a DC frequency component and a set of AC frequency components of increasing frequency. Information not necessary for human picture perception is identifiable in the frequency domain, and is filtered and quantized to reduce the amount of data needed to represent the picture.

Several well known and generally available apparatus and operation methods may be used for motion estimation in the vision processor 100, but motion estimator 92, which is disclosed in the aforementioned patent document of Fandrianto et al. and is hereby incorporated herein by reference, is particularly advantageous. As more fully described in the aforementioned patent document of Fandrianto et al., section 92 comprises two high-speed, multi-ported register files, an image block, best match block memory conveniently referred to as DP memory 124, and a search memory conveniently referred to as DPCM memory 130. Two funnel shifters 140 and 144 are connected, respectively, to the outputs of the DPCM memory 130. Funnel shifter 144 is also a transposer, and is shared with the DCT section 94 in order to reduce chip size. If desired, a dedicated transposer may be used in the DCT section 94, in which case shifter 144 need not have transposition capability. An arithmetic logic unit ("ALU") 154 receives the outputs of the shifters 140 and 144 as operandi. The output of the ALU 154 is routed back to inputs of the memories 124 and 130, and is also furnished to a tree adder 156. The output of the tree adder 156 is furnished to the Controller 102. The motion estimation section 92 provides for rapid half pixel interpolations, and quarter pixel interpolations and for rapid determination of pixel block differences, and also accommodates a variety of motion vector search algorithms such as binary search, full search, jump search, and any combination thereof down to one-quarter pixel interpolation.

Figure 6:
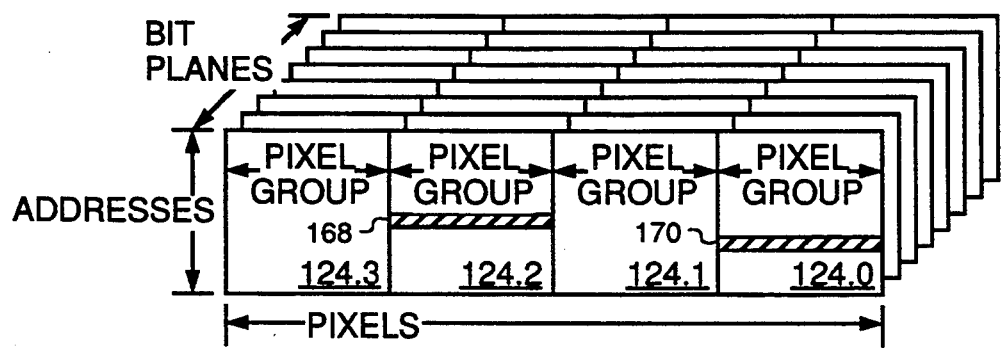
FIGS. 6, 7 and 8 are schematic representations of various memories in the vision processor of FIG. 4.

In the motion estimation section 92, the DP memory 124 is used generally to store current (preframe), matched, and other temporarily needed blocks, and hence functions to store image blocks for motion estimation, intermediate blocks for interpolation, and the prediction error and image blocks for DCT computations. For these purposes, the DP memory 124 is most conveniently conceptualized as a single memory of 128 addressable locations, each 8 pixels wide. The DP memory 124 is implemented for layout purposes as a set of four individually addressable A×B (address×pixel) banks of pixels 124.0–124.3, as illustrated in FIG. 6. Each of the banks 124.0–124.3 is configured as a collection of 32 addressable groups of 8 pixels per group. As each pixel consists of 8 bits, the DP memory 124 has eight bit planes, as shown in FIG. 6. The output from each of the ports A and B of the DP memory 124 is 8 pixels. For example, pixel group 168 of bank 124.2 may be addressed and read on port A, while pixel group 170 of bank 124.2 may be addressed and read on port B. The ports A and B of the DP memory 124 are capable of being read essentially simultaneously. Reading and writing are executable in the same address cycle.

The DP memory 124, including the organization of the write ports, the addressing of the memory, the control of read and write operations, and the internal design, is described in further detail in the aforementioned patent document of Fandrianto et al., and is incorporated herein by reference.

Figure 7:
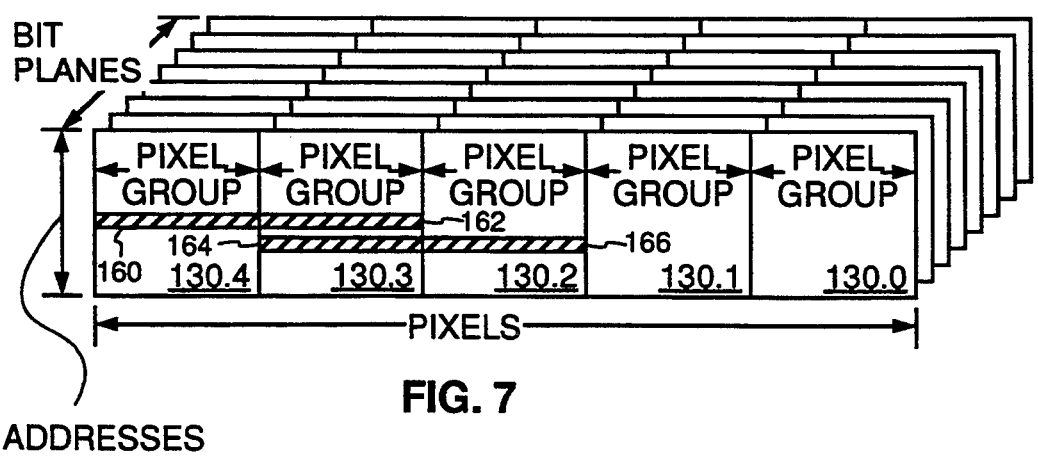

The DPCM memory 130 is used generally to store the search window 24, whether copied from frame memory 20 or interpolated from a best match block. For this purpose, the DPCM memory 130 is most conveniently conceptualized as a set of five M×N (address-×pixel) banks of pixels 130.0–130.4, as illustrated in FIG. 7. Each of the banks 130.4–130.0 is configured as a collection of 36 addressable groups of 8 pixels each. As each pixel consists of 8 bits, the DPCM memory 130 has eight bit planes, as shown in FIG. 7. When any one group of pixels in a bank of the DPCM memory 130 is accessed and read on one of the ports A or B of the DPCM memory 130, the adjacent group of pixels from an adjacent bank is automatically accessed and read on the same port. For example, if pixel group 160 of bank 130.4 is addressed and read on port A, pixel group 162 of bank 130.3 is also read on port A. If pixel group 164 of bank 130.3 is addressed and read on port B, pixel group 166 of bank 130.2 is also read on port B. Hence, the output from each of the ports A and B of the DPCM memory 130 is 16 pixels, 8 pixels from the selected group and 8 pixels from the adjacent group. The ports A and B of the DPCM memory 130 are capable of being read essentially simultaneously. Reading and writing are executable in the same address cycle.

The DPCM memory 130, including the organization of the write ports, the addressing of the memory, the control of read and write operations, and the internal design, is described in further detail in the aforementioned patent document of Fandrianto et al., and is incorporated herein by reference.

The DCT section 94 comprises RF memory 134, which is used for storing pixel data and DCT coefficients in conversion operations, for storing a quantizer matrix in multiple quantization operations, and for storing pixel or other data in general filter computations.

The output ports of the DCT section 94 are routed to three subsections. One subsection includes multiplier-accumulator 148 ("MAC"), which performs quantization, rounding, normalization, and accumulation operations for discrete cosine transform calculations and mode decision parameter calculation. Another subsection is shifter-transposer 144, which is shared with the motion estimation section 92 to minimize chip area. If desired, a separate shifter may be used in the motion estimation section 92 and a separate transposer may be used in the DCT section 94 to increase speed. With respect to the DCT section 94, the shifter-transposer 144 performs data transposition. Another subsection is the ALU 154, which also is shared with the motion estimation section 92. With respect to the DCT section 94, the ALU 154 performs simultaneous A+B and A−B operations on data in the RF memory 134, in one cycle.

Figure 8:
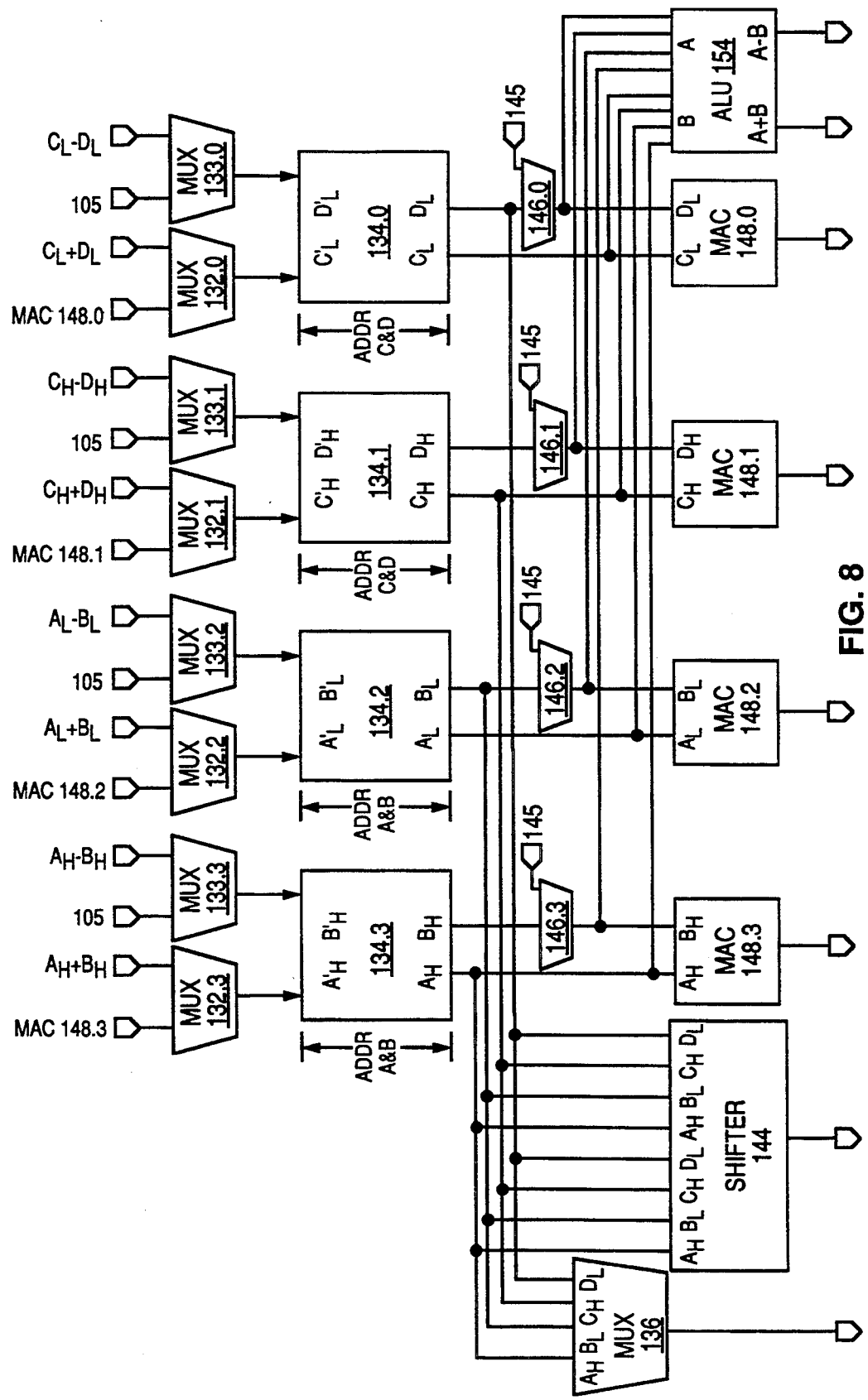

The register file block, or RF memory 134, is most conveniently viewed as comprising four banks 134.3–134.0, as shown in FIG. 8. Each of the banks 134.3–134.0 receives two addresses, and is capable of supporting two reads and two writes at the same time. For example, furnished addresses A and B, bank 134.3 addresses words $A_H$ and $B_H$ and bank 134.2 addresses words $A_L$ and $B_L$, which may be both read and written in the same address cycle. Similarly, furnished addresses C and D, bank 134.1 addresses words $C_H$ and $D_H$ and bank 134.0 addresses words $C_L$ and $D_L$, which may be both read and written in the same address cycle. Hence, each of the banks 134.3–134.0 is capable of operating independently as a numerical quantity in a datapath operation. Each of the banks 134.3–134.0 is configured as a collection of 64 addressable groups of 1 word (16 bits) each.

The arrangement of the RF memory 134 is particularly advantageously exploited by the MAC 148, which is arranged as four essentially identical multiplier-accumulator units 148.3–148.0 (FIG. 13), respectively associated with the banks 134.3–134.0 of the RF memory 134. The MAC unit 148.3 receives operandi $A_H$ and $B_H$, the MAC unit 148.2 receives operandi $A_L$ and $B_L$, the MAC unit 148.1 receives operandi $C_H$ and $D_H$, and the MAC unit 148.0 receives operandi $C_L$ and $D_L$. MAC units 148.3–148.0 receive their inputs $B_H$, $B_L$, $D_H$ and $D_L$. through a multiplexer 146, which allows multiplier-accumulator operations to be conducted using one operand loaded in register 145. The register 145 stores a word of mode decision parametric data or a quantizer value provided to register 145 over bus 105. Hence, multiplexer 146 selects the RF memory 134 for DCT calculations, and the output of register 145 for mode decision parameter calculations. As also shown in FIG. 8, the four words at the output of the MAC units 148.3–148.0 are routed back to respective ones of the inputs of each of the banks 134.3–134.0 through multiplexer sections 132.3–132.0, where they are written back into the RF memory in the same address cycle as the read is performed. The remaining input of each of the banks 134.3–134.0 can advantageously be used to simultaneously receive into the RF memory 134 data on the bus 105 or from the DP memory 124 or the DPCM memory 130 through multiplexer 133. The output of the MAC 148 is also routed to the DP memory 124 and the DPCM memory 130.

The shifter-transposer 144 receives through half of its inputs one word from each bank of the RF memory 134, and receives through the other half of its inputs a replication of the data received at the first half. For example, the shifter-transposer 144 receives words $A_H$-$B_L$-$C_H$-$D_L A_H$-$B_L$-$C_H$-$D_L$ at its input. This arrangement facilitates matrix transpose operations. Because the shifter-transposer 144 is shared with the motion estimation section 92, its inputs are received through multiplexer 142. In a transpose operation, four reads corresponding to the addresses A, B, C and D are fetched in the same address cycle, then transposed, then written back into a corresponding location in the RF memory 134 in a following address cycle through the ALU 154, operating in pass through mode. The ALU 154 receives a first operand $A_H$-$A_L$-$C_H$-$C_L$ and a second operand $B_H$-$B_L$-$D_H$-$D_L$ from the RF memory 134. Generally, in most DCT operations except transposition, A=C and B=D, and RF memory 134 functions as a two port read, two port write memory in the same address cycle. In transposition, RF memory 134 functions as a four port read, four port write memory in the same address cycle. Because the ALU 154 is shared with the motion estimation section 92, it is configurable in either pixel mode (sixteen 8-bit ALUs) or word mode (16 bit ALUs). If desired, separate ALUs may be used for the motion estimation section 92 and the DCT section 94. The inputs of the ALU 154 are received through a multiplexer 152. As shown in FIG. 4, multiplexer 152 in select zero mode selects the 16 pixel output from the DP memory 124 and the 16 pixel output from the DPCM memory 130 through shifters 140 and 144 as the B and A operandi respectively, in select one mode selects the 8 pixel (funnel shifted) output of port A of the DPCM memory 130 and the 8 pixel (funnel shifted) or 4 word (transposed) output of port B of the DPCM memory 130 as operandi B and A respectively, and in select two mode selects 4 words corresponding to addresses A or C (A=C) from the RF memory 134 and 4 words corresponding to addresses B or D (B=D) from the RF memory 134. As shown in FIG. 8, the output A+B of the ALU 154 is separately routed back to each of the banks 134.3-134.0 through multiplexer sections 132.3-132.0, and the output A−B of the ALU 154 is separately routed back to each of the banks 134.3-134.0 through multiplexer sections 133.3-133.0. Another output, which is selectively configurable as either (A+B), (A−B), or (A+B)/2 (marked X in FIG. 4 for convenience), is routed to the DP memory 124 and the DPCM memory 130. Another output, the absolute difference output |A−B|, is routed to the tree adder 156.

Direct outputs to the controller 102 and the I/O state machine 104 are provided for and from the DP memory 124, the RF memory 134, and the ALU 154. Multiplexer 126 selects either the 8 pixel output from port B of the DP memory 124 or eight of the sixteen pixels at the output of the ALU 154, and further selects a two pixel or one word data item for input to the controller 102 and the I/O state machine 104 over the bus 103. RF memory furnishes a 4 word data item that is provided to multiplexer 136, which selects a one word data item for input to the controller 102 and the I/O state machine 104 over the bus 103.

To maximize throughput, the DCT section 94 is pipelined, so that the write-back into the RF memory 134 occurs a few cycles after the corresponding read.

Memories 124, 130 and 134 are addressed in parallel by an address generator 120 with auto-increment capability. The address bus to DP memory 124 carries 2 addresses, the address bus to DPCM memory 130 carries 2 addresses, and the address bus to RF memory 134 carries 4 addresses. The address generator 120 is responsive to address data from the I/O state machine 104 and the decoder 112.

The architecture 100 implements a memory hierarchy in which the highest level is external DRAM or VRAM such as memory 30 shown in FIG. 1 and memory 60 shown in FIG. 2. The next level is the on-chip DP memory 124 and DPCM memory 130. The lowest level is the RF memory 134. Because of this memory hierarchy, the RF memory 134 and the MAC 148 can be engaged in intensive DCT computation operations while block data from the DP memory 124 or DPCM memory 130 is loaded into the RF memory 134 for subsequent processing in the DCT section 94.

Due to the manner in which selected elements of the motion estimation section 92 and the DCT section 94 are shared and the manner in which the outputs of the sections 92 and 94 and the I/O buses 103 and 105 from the controller 102 and I/O state machine 104 are routed to input ports of the DP memory 124, the DPCM memory 130, and the RF memory 134, serial or parallel operation of the sections 92 and 94 is accommodated. Parallel operation of the sections 92 and 94 maximizes the internal computational power of the architecture 100. Moreover, overlap of internal computation and external memory to internal memories 124, 130, and 134 data transfer is accommodated.

Functionality of Vision Process Architecture

Figure 3:
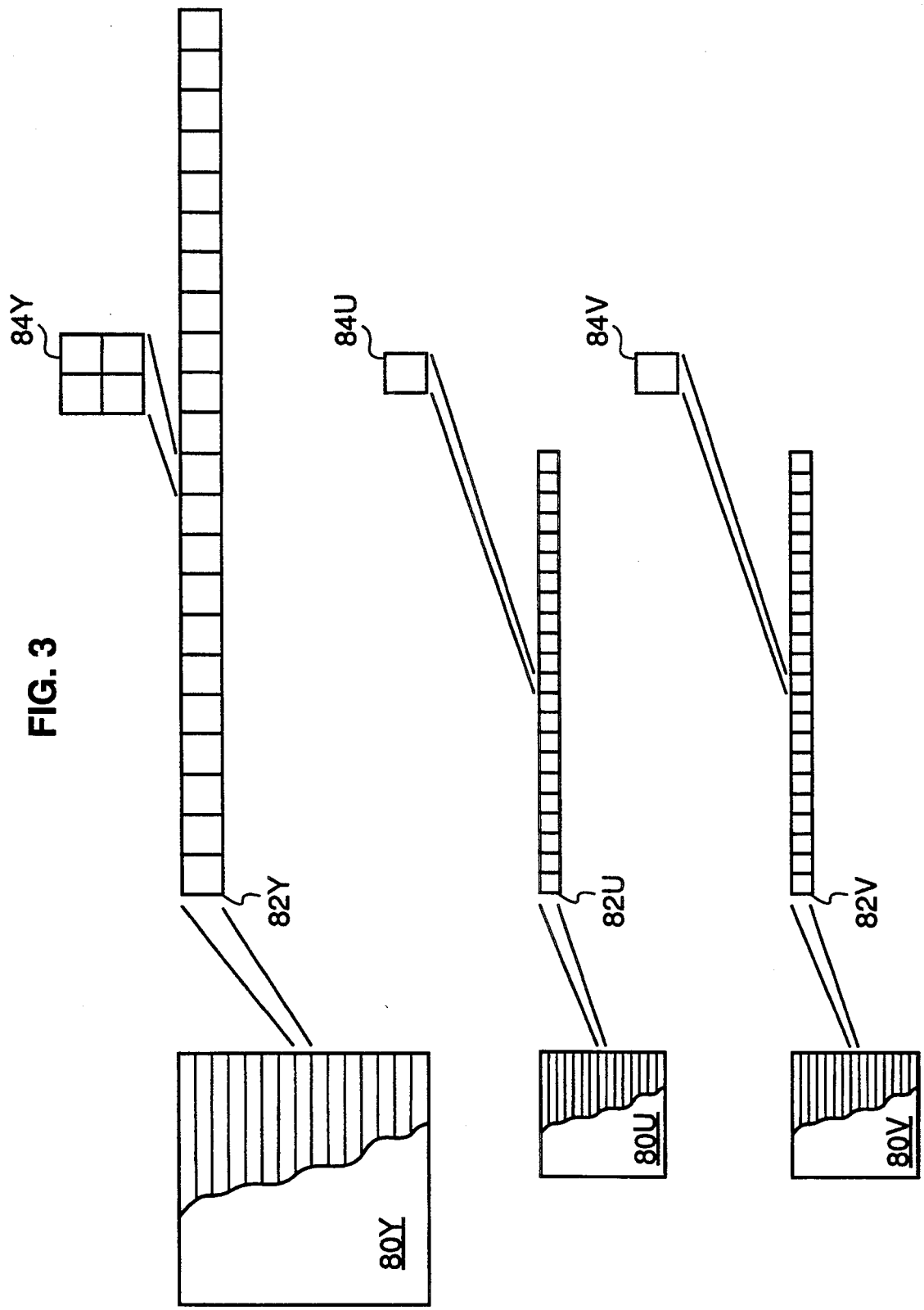
FIG. 3 is a schematic representation of the pixel arrangement in a frame of a vision processor.

Typically in video signal processing, the basic video information processing unit is a macro-block, which has a 16×16 pixel luminance matrix comprising four 8×8 luminance blocks and two 8×8 chrominance matrices. The relationship of a macro-block to a CIF frame is illustrated in FIG. 3. The significant pixel area 80 of a CIF frame includes a luminance "Y" frame 80Y containing 352×240 pixels, and two chrominance frames, frame 80U "U" and 80V "V" each containing 176×120 pixels. The CIF frame is vertically segmented into 15 groups of blocks, each containing 16 lines of luminance and 8 lines of each of the chrominances. An illustrative group of blocks is shown in an exploded insert of FIG. 3, the 16 lines of luminance being shown at 82Y and the two 8 lines of chrominances being shown at 82U and 82V. The groups of blocks are further segmented horizontally into twenty-two macroblocks, each like the macroblock illustrated at 84 in an exploded insert of FIG. 3. The macroblock 84 includes the four 8×8 luminance blocks referenced at 84Y, the U chrominance block 84U, and the V chrominance block 84V.

The vision processor 100 is suitable for encoding or decoding data. In an encoding application, vision processor 100 generally operates on data that has been preprocessed into a common format such as the previously mentioned CIF format. The preprocessed video signal is encoded frame by frame, and within each frame, macroblock by macroblock. The first frame of a group of frames is processed in intraframe mode, and the successive frames of the group are processed in predictive mode or, if desired, in alternately a predictive mode and an interpolative mode. The intraframe mode requires the greatest number of bits, the predictive mode an intermediate number of bits, and the interpolative mode the least number of bits. These modes are fully described in the aforementioned Wong article, and are hereby incorporated herein by reference. The modes are summarized below, to provide a context in which the functions of the architecture 100 may be understood.

Figure 5A:
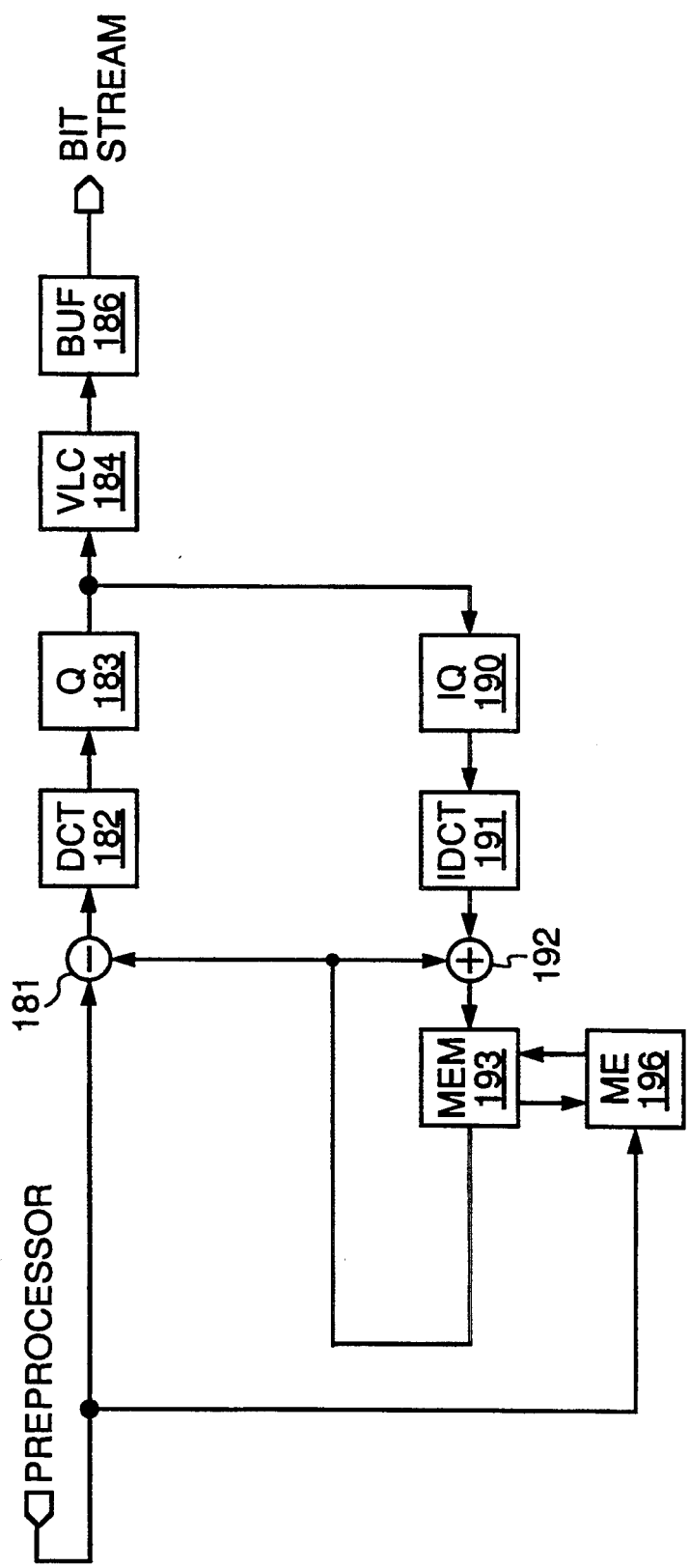
FIG. 5A–B are block schematic representations of a predictive transform loop.
Figure 5B:
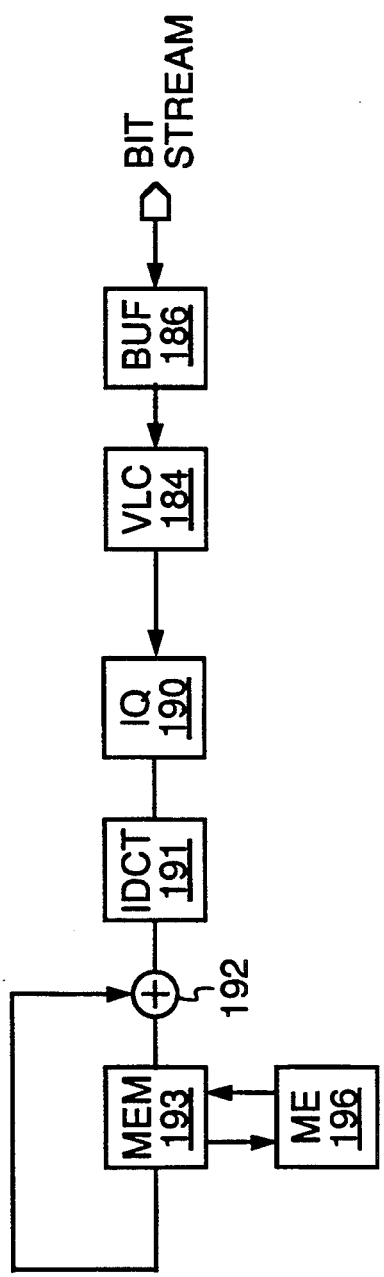

The intraframe mode and the predictive mode are modes of a predictive transform coding loop that is illustrated generally in FIG. 5. FIG. 5A represents encoding, while FIG. 5B represents decoding. The intraframe mode achieves data compression within a single frame, without reference to any other frame. Hence, it is suitable for encoding the first frame of a scene and to periodically reset the predictive transform coding loop at the end of each group of frames in the scene. Predictive mode realizes data compression between two frames. The decoded and reconstructed earlier frame is used as the prediction for the current frame, a prediction error is calculated for the current frame, and the prediction error is encoded.

Encoding of a frame in intraframe mode is performed on a macroblock by macroblock basis by the architecture 100. Four 8×8 blocks of the current frame (preframe) macroblock are copied into the RF memory. The data in the RF memory 134 are processed first with an 8×8 discrete cosine transform in step 182, and the DCT coefficients are quantized in accordance with uniform quantizer step-sizes expressed in a quantizer matrix in step 183. Ultimately, the quantized levels in the RF memory are copied from the RF memory into external memory through multiplexer 136, and are entropy coded in step 184 and stored in an output buffer in step 186. These are serial operations performed external to the vision processor 100. In preparation for the predictive mode, the quantized levels in the RF memory 134 are inversely quantized in step 190 and inverse discrete cosine transformed in step 191 to obtain a reconstructed picture, which is stored in an external preframe memory in step 193. The DCT step 182, the quantization step 183, the inverse quantization step 190, and the inverse DCT step 191 are performed in parallel operations in the DCT section 94 of the architecture 100.

Decoding of a frame in intraframe mode involves initially storing the encoded frame, as represented by the buffer step 186. The encoded frame is restored to fixed length coding in the inverse variable length coding step 184, generally as described above, and then copied into the RF memory 134. As shown in FIG. 5B, the quantized levels in the RF memory 134 are inversely quantized in step 190 and inverse discrete cosine transformed in step 191 to obtain the reconstructed picture, which is stored in an external memory in step 193.

Encoding of a frame in predictive mode is performed on a macroblock by macroblock basis, as follows. A 16×16 luminance macroblock of the current frame, known as an image block, is compared with a search window in the preframe memory in motion estimation step 196 to locate a best match search block in the previous frame encoded in intraframe or predictive mode. Various motion estimation techniques may be used, including generally well known techniques as well as the technique described in the aforementioned patent document of Fandrianto et al., which is hereby incorporated herein by reference. The best match block is stored in the DPCM memory 130 in memory step 193. These steps are performed in the motion estimator section 92 of the vision processor 100. The motion vector is stored in a register in the controller 102 and then, along with quantized DCT coefficients, is sent to an external controller for VLC step 184 and buffer step 186. The prediction error for the current image block is determined by first subtracting the best match search block from the image block, as represented by difference step 181. The prediction error is stored in the DP memory 124, and copied from there to the RF memory 134. The prediction error is processed in the discrete cosine transform step 182, and the DCT coefficients are quantized in accordance with a uniform quantizer step-sizes expressed in a quantizer matrix in step 183. Ultimately, the quantized prediction error levels are copied into external memory through multiplexer 136, and entropy coded in step 184 and stored in an output buffer in step 186, generally as described above. In preparation for the next predictive mode, the quantized prediction error levels in the RF memory 134 are inversely quantized in step 190 and inverse discrete cosine transformed in step 191 to obtain a reconstructed prediction error, which is added to the prediction in step 192 to obtain the next predictor. The next predictor is stored in the preframe memory, as represented by step 193.

Decoding of a frame in predictive mode involves initially storing the encoded frame, as represented by the buffer step 186. The encoded frame is restored to fixed length coding in the inverse variable length coding step 184, generally as described above, and then copied into the RF memory 134. As shown in FIG. 5B, the quantized levels in the RF memory 134 are inversely quantized in step 190 and inverse discrete cosine transformed in step 191 to obtain the prediction error. The prediction error is added to the appropriate block, as determined by the decoded motion vector, to obtain a block of the reconstructed picture, which is stored in an external memory in step 193.

Although the DCT and quantization steps 182 and 183, and the inverse DCT and quantization steps 190 and 191 are computationally intensive, requiring matrix transposition and many multiplication, accumulation, addition, and subtraction operations, they are quickly performed with parallel operations in the DCT section 94 accessing data resident in the RF memory 134. For example, the multiplications for the DCT step 182 and the inverse DCT step 191, and for the quantization step 183 and the inverse quantization step 190, are performed in the four MAC units 148 with operandi received from their respectively associated banks of the RF memory 134. Additions and subtractions for the DCT step 182 are performed generally in ALU 154 with operandi received from the outputs of the RF memory 134 through multiplexer 152. Matrix transposition is performed in the shifter 144, with the results being written back into the RF memory 134 through the ALU 154 set to pass through mode.

The motion estimation algorithm for the interpolative mode is based on a restrictive motion model rather than the good predictor algorithm of the predictor loop of FIG. 5. The interpolation is obtained by displacement and averaging of the previous and following frames with a prediction error being calculated based on the interpolated frame and heavily quantized to minimize bandwidth. If interpolative mode is desired, it may be performed in the motion estimation section 92. Blocks from which the interpolation is made are copied into the DPCM memory 130, and interpolation operations are performed generally as described in the aforementioned Fandrianto et al. application, and is incorporated herein by reference.

Data blocks required for performing the 8×8 discrete cosine transform 182, the quantization 183, the inverse quantization 190, and the inverse discrete cosine transform 191 in the DCT section 94 originate from various sources and are stored in the RF memory 134. For example, in intraframe mode encoding, the 8x8 pixel blocks of a current macroblock are copied from the DP memory 124. In decoding operations, the blocks are furnished from external memory through the I/O state machine 104 via bus 105 and selectively loaded to a bank of the RF memory 124 through MUX 132.

Control Components of the Vision Processor

In the architecture 100 of FIG. 4, a reduced instruction set controller 102 executes instructions for parallel and serial operations, and runs in parallel with the data path of the architecture 100. Controller 102 is any simple, general purpose controller of conventional design capable of executing simple arithmetic and logic operations. Controller 102 is operated by microcode, but may be software controlled if desired. If desired, a more powerful processor or a less flexible state machine may be used in place of controller 102. An input/output ("I/O") state machine 104 capable of transferring data between system memory (typically external page-mode DRAMs; not shown) and the controller 102 and memories 124 and 130 of the motion vector search architecture 100 is provided so that data transfers can be overlapped with compression operations. Various control signals for starting and terminating DMA transfers are received through port CONTROL and applied to the I/O state machine 104, which distributes related control signals throughout the architecture 100. The I/O state machine 104 supports burst mode transfers with system memory (not shown) over data bus ("DBUS") [31:0]. Command queue 106 is a set of registers which receive and store command data received through command bus ("CBUS") [15:0] from a host controller. Instructions for the I/O state machine 104 are furnished over bus 108 by command queue 106, which also provides command data to a program counter and sequencer ("PCS") 110. PCS 110 is responsive to an output enable address ("OEA") signal for incrementing an address stored therein and furnishing the address over an address bus ("ADBUS") to a program and microcode memory (not shown). A decoder 112 receives program and microcode information on an instruction bus ("IBUS") [31:0] from the program and microcode memory (not shown).

Signal codes useful in understanding the use and operation of the vision processor 100 are defined in Table 1.

TABLE 1

| Name | I/O | Definition |
|---|---|---|
| DBUS | I/O | General purpose data bus. Inputs pixel data, run and amplitude, quantization values, motion vector, variance, and other host to vision processor data. Outputs read data. When vision processor 100 is in "LOAD" mode, data from IBUS is transferred to and from DBUS transparently over bus 114. |
| CBUS | I | Command is written to vision processor 100 through this bus. When vision processor 100 is in "LOAD" mode, at the control of CMDVAL#, CBUS will latch the address presented to it by the host, and sent it to ADBUS. |
| IBUS | I/O | Microcode instruction from an external SRAM arrives in a 32-bit wide format every half-cycle to form a 64-bit microcode instruction. Under normal operation, IBUS is an input bus. IBUS will become an output bus to drive data from DBUS to the SRAM's in "LOAD" mode. |
| ADBUS | O | Microcode address bus, 14 bits wide (enough to address 16K×32SRAM). The upper 13 bits of this bus contain address bits, while the LSB (i.e., ADBUS<0> is a delayed signal from CLK. |
| CLK | I | Input clock having a 50% duty cycle up to 40 MHz. Clock is directly used, undivided. |
| OED# | I | Output enable for DBUS, negative true. A logic low, together with CS1# and READ correctly asserted with enable DBUS outputs, else outputs go into tristate. |
| OEA# | I | Output enable for ADBUS, negative true. A logic low will enable ADBUS outputs, else outputs go into tristate. |
| OES# | I | Status output enable, negative true. A logic low will enable status outputs, else status bus goes tristate. |
| CS0# | I | Chip select 0. A logic low will select the vision processor 100 for command write through CBUS. |
| CS1# | I | Chip select 1. A logic low will select the vision processor 100 for data transfer through DBUS. |
| RST | I | Reset pin. Routed throughout vision processor 100. In normal operation, RST must be low. If RST is brought high, vision processor 100 enters a reset condition in which the states of internal state machine and sequencer go into a reset state. |
| CMDVAL# | I | Command valid pin. Applied to command queue 106. A logic low indicates that CBUS contains a valid command instruction and should be latched (provided that CS0# is also set). |
| READ | I | Read pin. Applied to I/O state machine 104. A logic low indicates a write into vision processor 100, and a high means read from the vision processor 100. This pin is relevant to read/write of data through DBUS. |
| DATVAL# | I | Data valid pin. Applied to I/O state machine 104. A logic low indicates DBUS contains valid data. |
| ENDIO# | I | Ending I/O read or write cycle. Applied to I/O state machine 104. A logic low, lasting for 1 cycle, will indicate an end of the read or write cycle and essentially cause the I/O state machine to go back to its idle state. |
| LOAD# | I | Load pin. Routed throughout vision processor 100. Logic low, lasting for the duration of the load mode, together with CS0# asserted, will determine that the vision processor 100 is selected to enter "LOAD" mode, the READ pin will determine the direction of data transfer between IBUS and DBUS. |
| STAT meanings: | O | Status pins with the following STAT[4] Datapath busy STAT[3] VP ready to receive/transmit data STAT[2] I/O state machine busy STAT[1] Command queue almost full STAT[0] Command queue full Placing an external pull-up resistor on the STAT[1] pin allows the host to detect whether or not vision processor 100 exists at this location since, after reset, STAT[1] becomes low: |

TABLE 1-continued

| Name | I/O | Definition |
|---|---|---|
| | | STAT[1:0] encodings are as follows: |
| | | 0 0 Command queue quite empty, but not empty |
| | | 0 1 Encoded as command queue empty |
| | | 1 0 Command queue almost full, only 1 left |
| | | 1 1 Command queue is completely full |
| $V_{cc}$ | P | Power pin, 5-volt supply. |
| $V_{SS}$ | G | Ground pin, connected to system ground. |

Control of Datapath Operations

The controller 102 is used to perform serial 16 bit data manipulation of add, subtract, compare, shift and move operations in parallel with the datapath operations. Hence, serial operations not ideally suited for the parallel structure of the main datapath of vision processor 100 are performed generally in parallel with the main datapath. The controller 102 is a relatively simple 16-bit RISC processor of any suitable design. Suitable software systems, including a high-level compiler, linker and assembler systems (C and Pascal) for maximum programmability, are well known and generally available. In one suitable arrangement, the controller 102 comprises a RISC register file (not shown) and a RISC ALU (not shown). The RISC register is configured as a 32 word, 16 bits/word random access register. Registers 0-15 (not shown) are general purpose registers which are read and written by the RISC ALU. These registers are 3 port registers generally of the type permitting two reads and a write to occur in one cycle, as is well known in the art. The write-back is delayed one cycle. To facilitate streams of codes with data dependency back to back, a read port bypass logic is implemented. A data dependency logic to either or both read ports available to bypass the RISC register file and provide the current data. Registers 16-31 (not shown) are special purpose registers, and are variously read only, write only, or read/write. The content of these registers is interpreted specifically for certain functions, as listed in Table 2.

TABLE 2

| | |
|---|---|
| RR16 | : dpagA : DP Address Generator Port A. This register defines the starting address to the read port A of DP Memory. Write only register from RISC ALU. |
| RR17 | : dpagB : DP Address Generator Port B. This register defines the starting address to the read port B of DP Memory. Write only register from RISC ALU. |
| RR17 | : dpagW : DP Address Generator Port W. This register defines the starting address to the write port W of DP Memory. Write only register from RISC ALU. |
| RR19 | : cmagA : DPCM Address Generator Port A. This register defines the starting address to the read port A of DPCM Memory. Write only register from RISC ALU. |
| RR20 | : cmagB : DPCM Address Generator Port B. This register defines the starting address to the read port B of DPCM Memory. Write only register from RISC ALU. |
| RR21 | : cmagW : DPCM Address Generator Port W. This register defines the starting address to write port W of DPCM Memory. Write only register from RISC ALU. |
| RR22 | : mode : Mode register. Read and Write by RISC ALU. bit 1..0 → defines the increment count of DPCM address 00 : increment by 8 |

TABLE 2-continued

| | |
|---|---|
| | 01 : increment by 16 |
| | 10 : increment by 32 |
| | 11 : increment by 64 |
| | bit 3..2 → defines the increment count of DP address |
| | 00 : increment by 1 |
| | 01 : increment by 2 |
| | 10 : increment by 4 |
| | 11 : increment by 8 |
| | The above increment count applies simultaneously to all A, B, W address ports. |
| | bit 4 : CCITT bit |
| | 0 : CCITT mode : Run and Amplitude are computed based on 8×8 block size. DC intra term is unsigned magnitude. Magnitude on non intra DC is 7 bit wide only. |
| | 1 : CTX mode : Run and Amplitude are based on 16×16 block size. Intra DC term is passed unmodified as two's complement number. Magnitude term is 8 bit wide. |
| | bit 6..5 : rounding mode bit Both bits must be set to 11 to make the adder add by 1 to the LSB position. This would make round up toward positive become a possibility. Otherwise "0" will be added to the LSB, meaning truncation if averaging operation is performed. |
| | bit 7 : sign extend in right shift of RISC operation If set to 11111, the result of RISC right shift operation will be sign extended, otherwise it will be zero filled. |
| | bit 11..8 : 4 bit timer control These 4 bit timer control should be set to zero initially. For faster speed of operation of datapath memories, the timer bits can be programmed for a different values. |
| | bit 15..12 : reserved, and must be set to zero. |
| RR23 | : Tree Adder Accumulator Register. During motion search, the absolute pixel difference will be accumulated and stored in this register. This 16 bit register can be cleared and accumulated (to an overflow value of 0×7fff) by tree adder hardware and readable by RISC ALU. |
| RR24 | : Loop counter register. This 5 bit register will hold a total value of loop count − 1, and will start to count down at the sequencer instruction "wait". Sequencer will jump to target branch value if this loop counter register is non-zero, else it will go to PC + 1. Writable by RISC ALU. Not readable. |
| RR25 | : Target Branch Register. The jump address will be stored in this register. Current implementation of this register is 13 bit wide, i.e. bit [12:0]. The content of this register will be read and used by the sequencer to determine the next PC address. Writable by RISC ALU. Not readable. |
| RR26, RR27, RR28, RR29 | : reserved Not writable or readable by RISC ALU. Program should not attempt to perform read or write into these registers. |
| RR30 | : Snooping register to the Left Most Bank of Datapath RF Read Only by RISC ALU. This pseudo register is the window to which data from the Left most bank of Datapath register file can be snooped and moved into Controller. Read port A of the left most bank is the where the data is snooped. |
| RR31 | : I/O Register 16 bit I/O register is available for read/write to RISC ALU. This register can also be set to |

TABLE 2-continued

DBUS[15:0] by asserting "datval" signal. This register can be read by the external DBUS by asserting "read and datval" signals, and data will appear at DBUS[15:0]

The RISC instruction format is 16 bits. The 3 most significant bits are an opcode bit field. Valid opcodes are listed in Table 3.

TABLE 3

Opcode Bit Field (3):
000 Housekeeping
    If followed by all zeroes, instruction is nop.
    If "imm" field is set to 1, instruction is
    move long immediate (movl). This indicate the
    next risc instruction field must be treated as
    a long 16 bit immediate value to be stored to
    destination register previously specified.
001 ADD Dest = Source2 + Source1
010 SUB Dest = Source2 −Source1
011 Reserved
100 CMP Set condition code (Source2 − Source1)
    2 bit Condition code CC is encoded as:
        11 : Less than
        10 : Equal
        00 : Greater
        01 : Not coded
101 MOV Dest = Source1
110 SHF Dest = Source2 shifted by amount in
    Source1
    Bit [4] of Source1 is treated as the two's
    complement sign bit. A negative value
    indicates a left shift, a positive value
    is right shift. The right shift is sign
    extended if mode bit[7] is set, other wise
    it is zero filled.
11 PEN Dest = Priority Encode [Source1]

The next 2 bits are EXEC bits. The next bit is a 1 mm bit. The next 5 bits contain the source 1, or immediate. The next 5 bits, the five least significant bits, contain the source 2, or destination.

I/O State Machine 104 permits data from external memory to be loaded into the DPCM memory 130 and the DP memory 124 through DBUS in a burst mode I/O operation. An I/O command is initiated through the command bus, and begins a state machine that accepts 32 bit data at every other clock cycle (under DATVAL signal control) and places it in contiguous memory locations inside the DPCM memory 130 or the DP memory 124, as desired. The assertion of an "ENDIO" signal will terminate the I/O state machine 104 and stop the loading of data. Unloading data from the DP memory 124 or the DPCM memory 130 to external memory is also done in a similar way.

When I/O command execution is in progress, "IObusy" signal will be asserted and will be deasserted once "ENDIO" is issued. During IObusy period, if the vision processor 100 is ready to transmit and receive data, IOxfer signal will be asserted, and data transfer may be started by external control asserting "datval" signal.

Pixel loading and unloading will cause IOxfer to be continuously asserted, simply because the vision processor 100 is always ready to transmit and receive pixel data. This observation makes the handshaking of IOxfer unnecessary during pixel transfer. The case is not necessarily true for reading run and amplitude values from the vision processor 100, however.

The I/O state machine 104 is also capable of computing the number of "run of zero values of pixels" at a given location in the DP memory 124. Following the run of zeroes, the non zero pixel value is converted into a sign-magnitude representation. When reading run-/amplitude pair values from the vision processor 100, the computation of this run/amplitude is done on the fly. Therefore the IOxfer signal is asserted or deasserted depending on whether a non-zero pixel value is present.

The data format of run/amplitude is 32 bit and is coded as follows. Run is coded as an 8 bit unsigned quantity occupying bit [23 . . . 16]. The sign is coded as a 1 bit sign at bit [8]. The amplitude is coded as an 8 bit unsigned amplitude at bit [7 . . . 0]. For CCITT mode, non intra-DC amplitude can only be bit [6 . . . 0], while for CTX mode, non-intra-DC amplitude can be [7 . . . 0]. The remaining bits are set to zero and reserved for future use. Normally run=0 is illegal, and amplitude=0 is also illegal. But these cases are allowed under the following conditions. Under one condition, the reading of intra DC value is coded as run=1 and amplitude is anything including zero. For the CCITT format this is an unsigned 8 bit number, while for CTX format this is a 9 bit two's complement number. Under another condition, the end of run/amplitude pair is coded as run=0, ampl=0 (i.e. all 32 bit=O) for both intra/inter cases. The writing of run/amplitude paid to VP is similar, but the assertion of "ENDIO" is used to terminate the I/O state machine 104.

The I/O state machine 104 converts the sign/amplitude into a two's complement representation inside the DP memory 124 unmodified. The writing of this run-/amplitude pairs into the DP memory 124 is into memory locations that have been previously cleared to zero. Each pixel data in this case occupies 16 bit word size in DP memory.

In the command queue 106, commands received through the command bus (CBUS) are placed into a 4 register deep FIFO. Commands will be executed in the order received, I/O or datapath command will stay in the command FIFO until certain conditions are met to allow their execution to happen. The command buffer fullness is encoded in the status bits as follows: 00 indicates that command queue is quite empty but not empty; 01 indicates that command queue is empty; 10 indicates that command queue is almost full, having only 1 queue left; and 11 indicates that command queue is full.

Command queue being empty does not mean that vision processor is idle. The vision processor 100 may still be executing the last datapath and/or IO command. When the command queue is full, incoming command will be discarded and no error will be reported by the vision processor 100. There is one exception, however, an "init" command will always be received and immediately executed. The "init" command is a soft reset which has the same functionality as the assertion of reset signal (hardware reset). This reset will clear the command queue as well as terminating any executing IO or datapath command, thus bringing the vision processor 100 into an idle state.

The program counter and sequencer 110 determines the flow of the microcode instruction execution. Since the risc instruction within the same microcode word may need to have its own way to branch, the "EXEC" bit field in the risc instruction becomes useful to achieve this purpose. The sequencer takes its instructions from a 3 bit field of the 64 bit microcode word. The encoding is listed in Table 4.

TABLE 4

000 JNU     Jump to take on a new command from the top

TABLE 4-continued

| | | |
|---|---|---|
| | | of command queue stack as the next PC address. |
| 011 | JMP | Jump to Target Branch Register (RR25) as the next PC address. |
| 101 | JSR | Jump to Target Branch Register and save the current PC + 1 into subroutine return address stack. The stack is 2 register deep. Thus up to 2 levels of nested subroutine calls can be supported. |
| 001 | RTS | Jump to the top of subroutine return address stack, and pop the stack. |
| 110 | BGE | Jump to RR25 if Cond Code is greater or equal else continue PC + 1. |
| 111 | BLT | Jump to RR25 if Cond Code is less than, else continue PC + 1. |
| 010 | NXT | Jump to PC + 1 always. |
| 100 | WAIT | Jump to RR25 if loop counter is non zero and decrement the loop counter by 1, else continue PC + 1. |

Datapath and I/O operations are called through CBUS, the command bus. This in turn will enable the command to be queued into command queue stack. Execution will begin if certain conditions are met, else the command will wait in the command queue. The command word is 16 bit wide, they are broken down into 3 fields, which are listed in Table 5.

TABLE 5

| | | |
|---|---|---|
| Bit [15] Wait bit | | If set, command must be kept in queue, and will be executed only if datapath not busy and IO state machine is not busy. If reset, command can be executed immediately provided that: for an I/O command, if IO state machine is not busy; and for a datapath command, if datapath is not busy. One exception is the "init" command; once issued, it will bypass all other command queue and executed immediately. |
| Bit (14..11) | | Type 3 or 4 bit "type of command" field |
| | 000 | Housekeeping command. If bit [11] is zero, command is "init", else it is reserved/noop. |
| | 001 | Datapath command. Bit [11.0] is 12 bit subroutine call address entry point. |
| | 0100 | IO command write to RISC register 31. |
| | 0101 | IO command read from RISC register 31. |
| | 1000 | IO command write to DPCM memory. Bit [10..0] is 11 bit starting address to DPCM memory. |
| | 1001 | IO command write to DP memory. Bit [10..0] is 11 bit starting address to DP memory. |
| | 1010 | IO command read from DPCM memory. Bit [10..0] is 11 bit starting address to DPCM memory. |
| | 1011 | IO command read from DP memory. Bit [10..0] is 11 bit starting address to DP memory. |
| | 1100 | IO command write RUN/AMPL INTRA. Bit [10..0] is 11 but starting address to DP memory. |
| | 1101 | IO command write RUN/AMPL INTER. Bit [10..0] is 11 bit starting address to DP memory. |
| | 1110 | IO command read RUN/AMPL INTRA. Bit [10..0] is 11 bit starting address to DP memory. |
| | 1111 | IO command read RUN/AMPL INTER. Bit [10..0] is 11 bit starting address to DP memory. |
| Bit [11..0] | | Address 11 or 12 bit address field. Note that for IO command address, the least significant bit is addressing data at 16 bit word boundary. |

Addressing

Figure 9A:
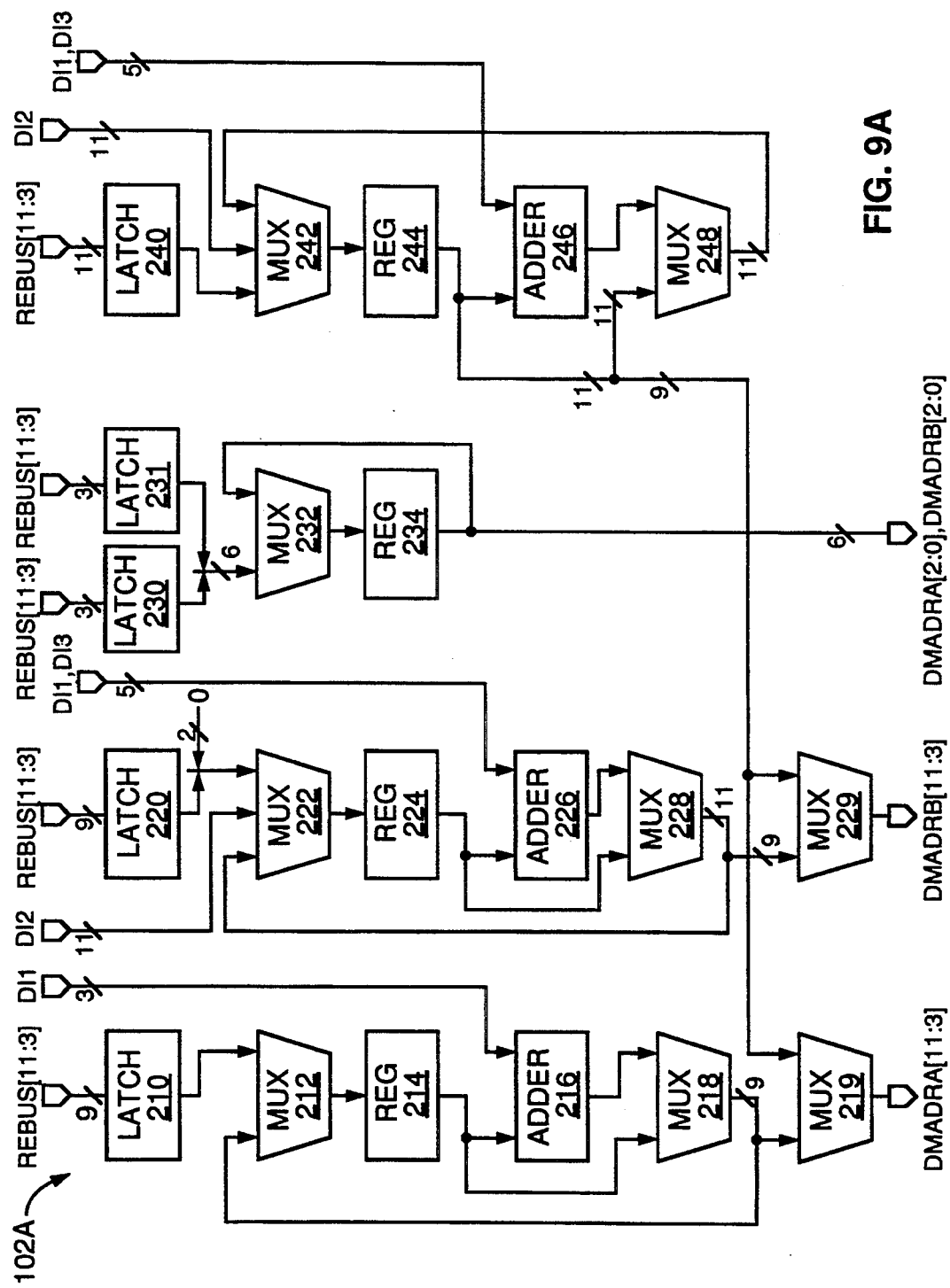
FIGS. 9A–B are block diagrams of an address generator for the memories of FIGS. 7 and 8.

The address generator 120, illustrated in greater detail in FIG. 9, establishes the addressing of DP memory 124, DPCM memory 130, and RF memory 134. The various functional elements of the address generator 120 are controlled by microcode through the decoder 112 (FIG. 4).

The DPCM memory 130 is a three ported memory having read ports A and B and write port W. The addressing of the DPCM memory 130 is done by section 120A of the address generator 120 shown in FIG. 9A. The section 120A is described in the aforementioned patent document of Fandrianto et al., and is incorporated herein by reference.

The DP memory 124 is also a three ported memory having read ports A and B and write port W. The section of the address generator 120 provided to address DP memory 124 (not shown) is similar to the section 120A, except for a few notable differences, as described in the aforementioned patent document of Fandrianto et al., and is incorporated herein by reference.

Figure 9B:
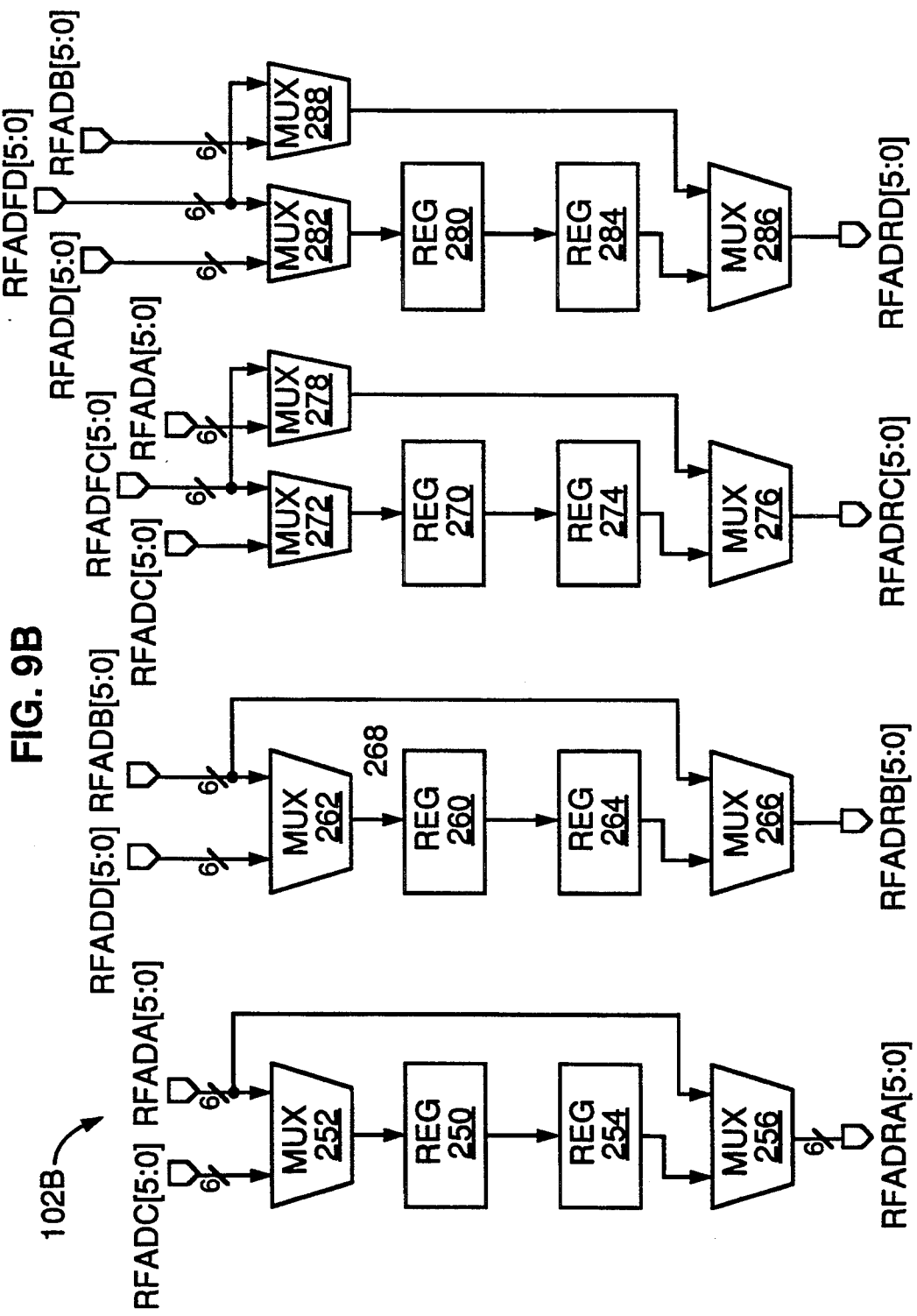
Figure 10A:
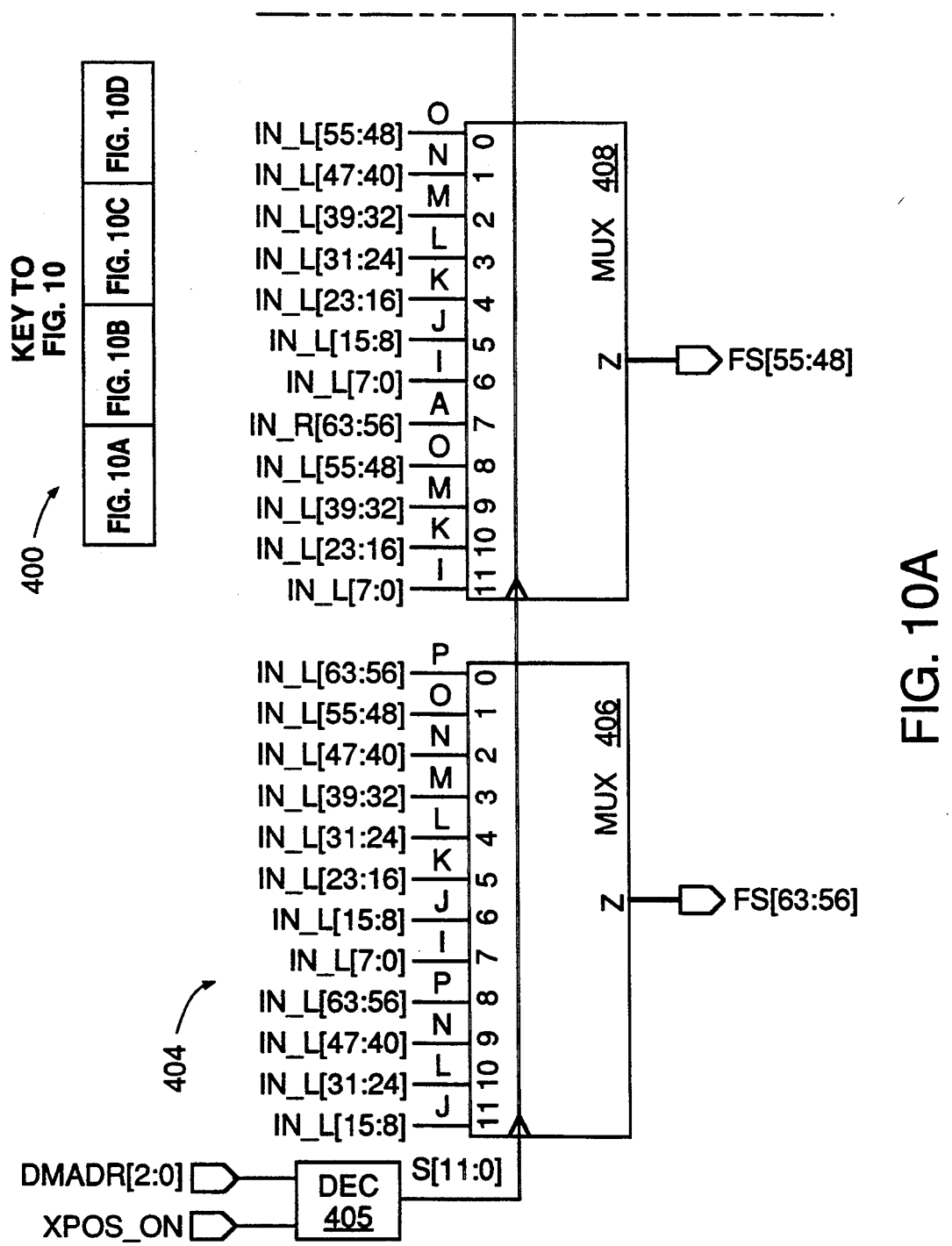
Figure 10B:
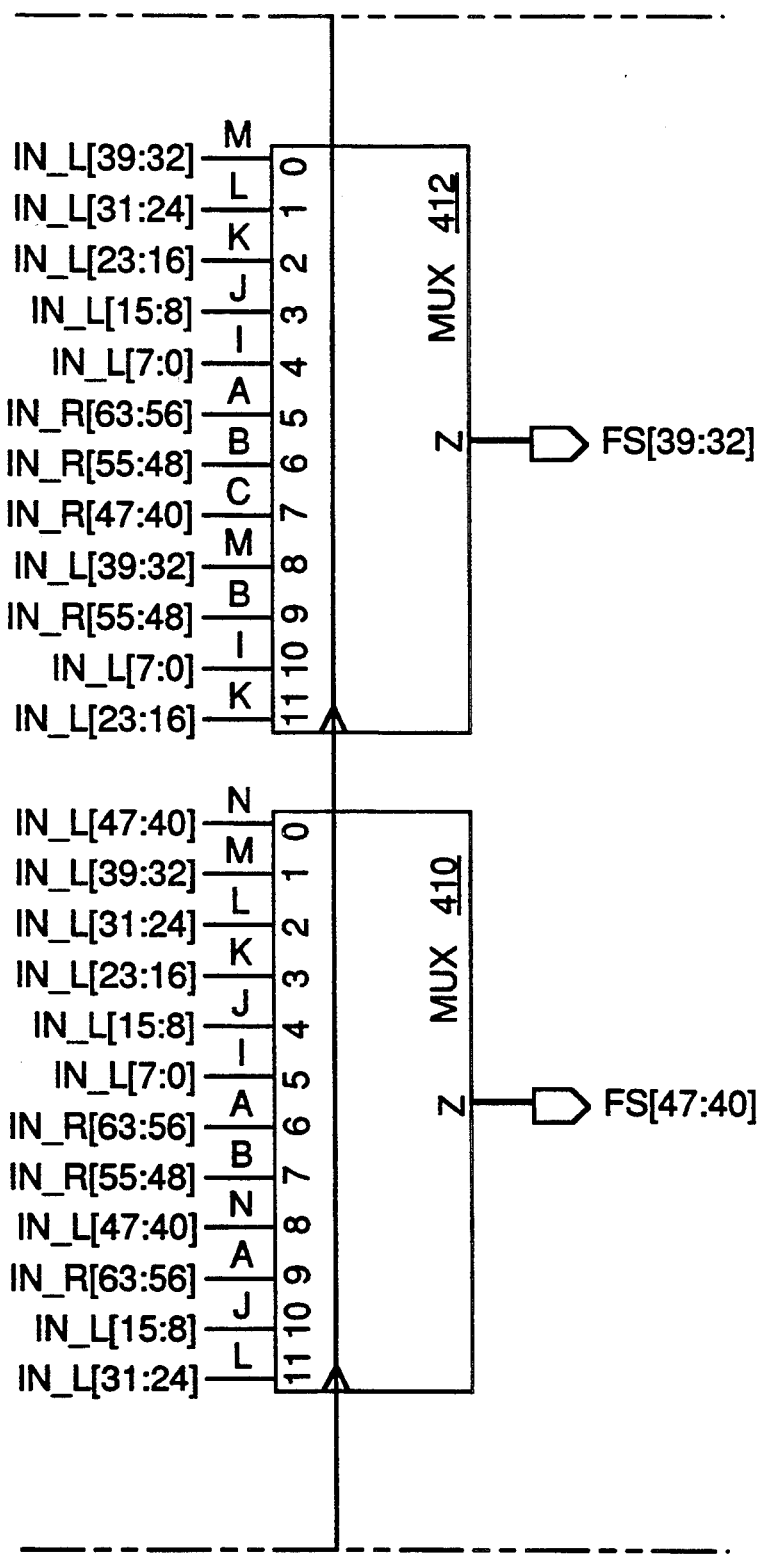
Figure 10C:
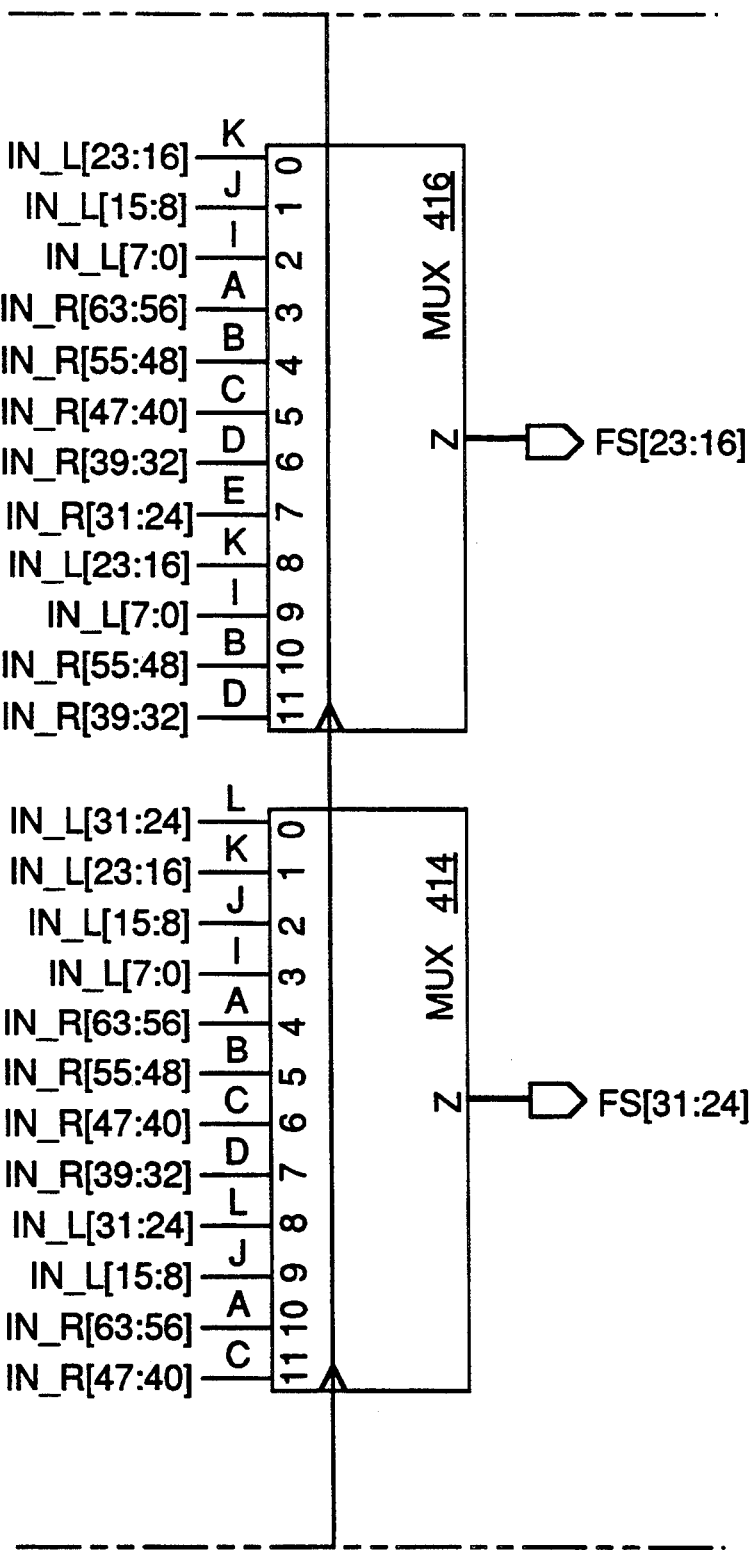
Figure 10D:
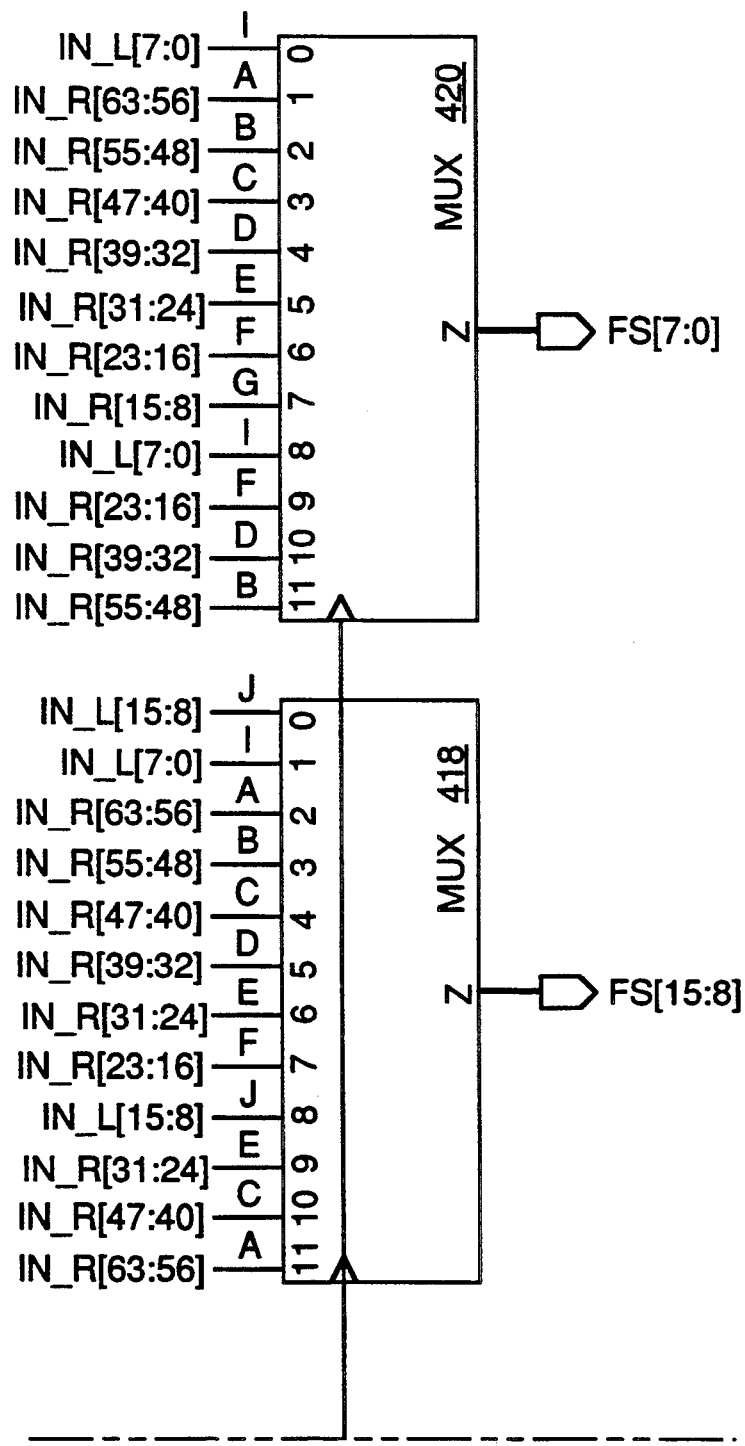

The reference RF memory 134 is configurable as a two port read, two port write memory for most DCT operations; and as a four port read, four port write memory for transpose operations. Addresses are generated based on inputs from the instruction fields of microcode furnished to the decoder 112 (FIG. 4). As shown in FIG. 9B, the inputs are RFADA [5:0] and RFADB [5:0] for the read address fields (phase 1 signal), RFADC [5:0] and RFADD [5:0] for the write address fields (phase 2 signal), and RFADFC [5:0] and RFADFD [5:0] for the read/write transpose address fields (phase 1 signal). The ports RFADRA [5:0], RFADRB [5:0], RFADRC [5:0] and RFADRD [5:0] have corresponding preloadable registers 250, 260, 270 and 280 respectively in the section 120B of the address generator 120, which are loaded through multiplexers 252, 254, 256 and 258 respectively with inputs RFADC [5:0] or RFADA [5:0], RFADD [5:0] or RFADB [5:0], RFADC [5:0] or RFADFC [5:0], and RFADD [5:0] or RFADFD [5:0]. The outputs of registers 250, 260, 270 and 280 are furnished to registers 254, 264, 274 and 284 for the purpose of an in-place transposition, since the read and write-back occur during an address cycle having two clock events. Output RFADRA [5:0] is obtained through multiplexer 256 either from the output of register 254 or directly from the input RFADA [5:0]. Similarly, output RFADRB [5:0] is obtained through multiplexer 266 either from the output of the register 264 or directly from the input RFADB [5:0]. Output RFADRC [5:0] is obtained through multiplexer 276 either from the output of the register 274 or directly from the input RFADA [5:0] or the input RFADFC [5:0] through multiplexer 278. Similarly, output RFADRD [5:0] is obtained through multiplexer 286 either from the output of the register 284 or directly from the input RFADB [5:0] or the input RFADFD [5:0] through multiplexer 288.

Section 120B of the address generator 120 in FIG. 9B is not provided with auto increment capability, all addresses being loaded directly from microcode. Auto increment capability may be provided, however, in a manner similar to that shown in FIG. 9A for the section 102A, for example.

Datapath Elements in the DCT Section

An illustrative funnel shifter and transposer 404 suitable for use as shifter-transposer 144 (and also as shifter 140 in the motion estimation section 92) is shown in FIG. 10. The input of the illustrative shifter-transposer 404 is 128 bits, arranged as eight word data assembled from the output of the RF memory 134. The 64 most significant bits are denoted the left input In_L [63:0]. The left side input is further separated into pixels In_L [63:56], In_L [55:48], In_L [47:40], In_L [39:32], In_L [31:24], In_L [23:16], In_L [15:8], and In_L [7:0], denoted P, O, N, M, L, K, J and I respectively. The 64 least significant bits are denoted the right input $IN_R$ 63:0]. The right side input is further separated into pixels In_R [63:56], In_R [55:48], In_R [47:40], In_R [39:32], In_R [31:24], In_R [23:16], In_R [15:8], and In_R [7:0], denoted A, B, C, D, E, F, G and H respectively. The left and right side pixels are applied to eight 12:1 multiplexers 406, 408, 410, 412 414, 416, 418 and 420 in the order shown in FIGS: 10A-10B. The select inputs of the multiplexers 406, 408, 410, 412, 414, 416, 418 and 420 are connected to the output of a decoder 405, which decodes the address segment DMADR [2:0].

In the motion estimation section 92, shifters 140 and 144 operate as funnel shifters in conjunction with the DPCM memory 130 for selectively shifting from zero to seven pixels to the left on a pixel boundary in accordance with a segment of the address for the DPCM memory 130. This arrangement supports pixel-group random access memory ("PRAM") addressing, both of which are more fully described in the aforementioned patent document of Fandrianto et al. and are incorporated herein by reference. Table 6 following lists the output FS [63:0] as obtained from the input In_L [63:0] and In_R {63:0] in terms of pixels A-P.

TABLE 6

| MUX SELECT | DATA OUT | | | | | | | | COMMENT |
|---|---|---|---|---|---|---|---|---|---|
| 0 | P | O | N | M | L | K | J | I | Pass Through Mode |
| 1 | O | N | M | L | K | J | I | A | Shift Left 1 |
| 2 | N | M | L | K | J | I | A | B | Shift Left 2 |
| 3 | M | L | K | J | I | A | B | C | Shift Left 3 |
| 4 | L | K | J | I | A | B | C | D | Shift Left 4 |
| 5 | K | J | I | A | B | C | D | E | Shift Left 5 |
| 6 | J | I | A | B | C | D | E | F | Shift Left 6 |
| 7 | I | A | B | C | D | E | F | G | Shift Left 7 |

In the DCT section 94, shifter/transposer 144 operates in conjunction with the RF memory 134 to perform matrix transpositions useful in the first half of a parallel two dimensional discrete cosine transform operation, prior to performing the second half of a DCT operation. Transposition is implemented in the embodiment of FIG. 10 as data swapped in 16 bit segments, with four different arrangements being available. Assuming data is furnished to the transpose matrix 402 in segments W, X, Y and Z, transposed data is selectively arranged as WXYZ (pass through), XWZY, YZWX, or ZYXW.

Transposition is particularly useful in the first half of a parallel two dimensional discrete cosine transform operation, prior to performing the second half of a DCT operation. In a transposition operation, the 128-bit or eight 16-bit word data, which as shown in FIGS. 4 and 8 is the output from the RF memory 134, the circuit 404 is responsive to the address segment DMADR [2:0] and the mode signal XPOS ON, which are applied to the select inputs of the multiplexers 406, 408, 410, 412, 414, 416, 418 and 420 through the decoder 405, in accordance with Table 7 following.

TABLE 7

| MUX SELECT | DATA OUT | | | | | | | | COMMENT |
|---|---|---|---|---|---|---|---|---|---|
| 8 | P | O | N | M | L | K | J | I | WXYZ Pass Through Mode |
| 9 | N | M | A | B | J | I | E | F | XWZY |
| 10 | L | K | J | I | A | B | C | D | YZWX |
| 11 | J | I | L | K | C | D | A | B | ZYXW |

Advantageously, the inputs 0-7 of the multiplexers 406, 408, 410, 412, 414, 416, 418 and 420 used for funnel shifting in conjunction with the motion estimation section 92, and the inputs 8-11 of the multiplexers 406, 408, 410, 412, 414, 416, 418 and 420 used for transposition in conjunction with the DCT section 94, share the same circuit wiring, thereby saving chip area. Advantageously, the output of the shifter/transposer 144 is directed through the ALU 154 operating in pass through mode, in order to save channel space, although at the expense of a slight initial pipeline delay of about 2 or 3 nanoseconds.

Figure 11A:
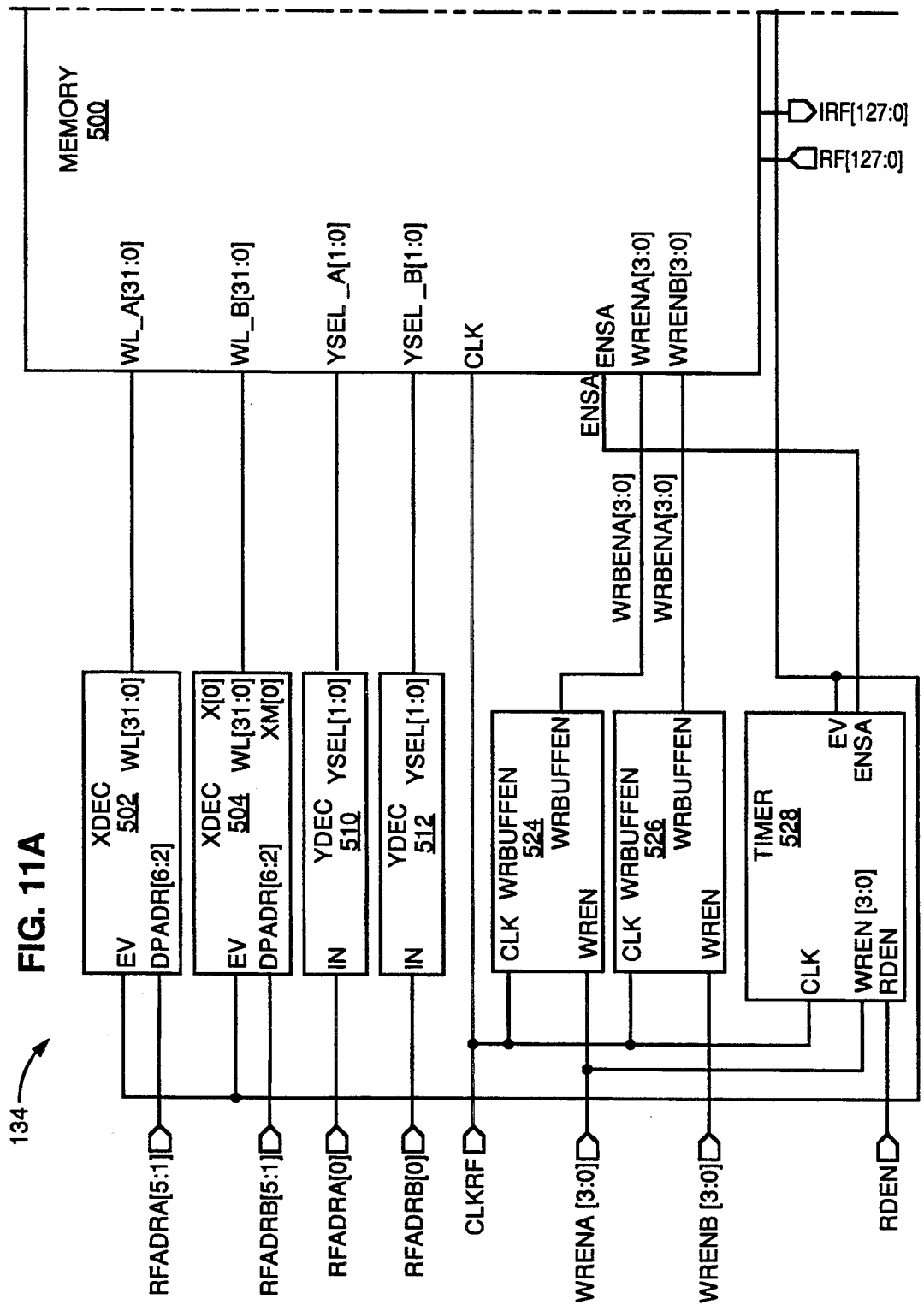
FIGS. 11A–B are block schematic diagrams of a RF memory useful in the datapath of the vision processor of FIG. 4.
Figure 11B:
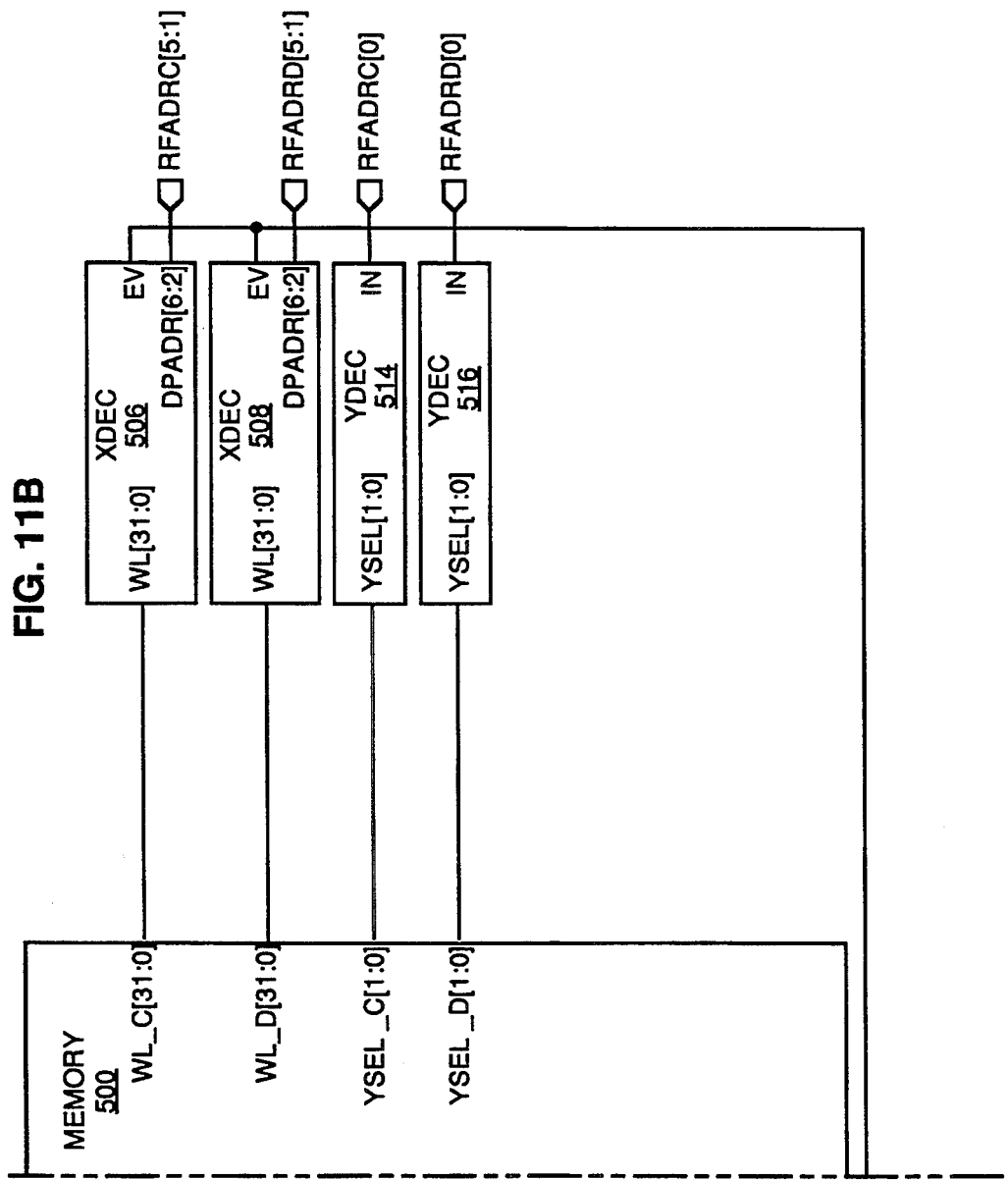
Figure 12:
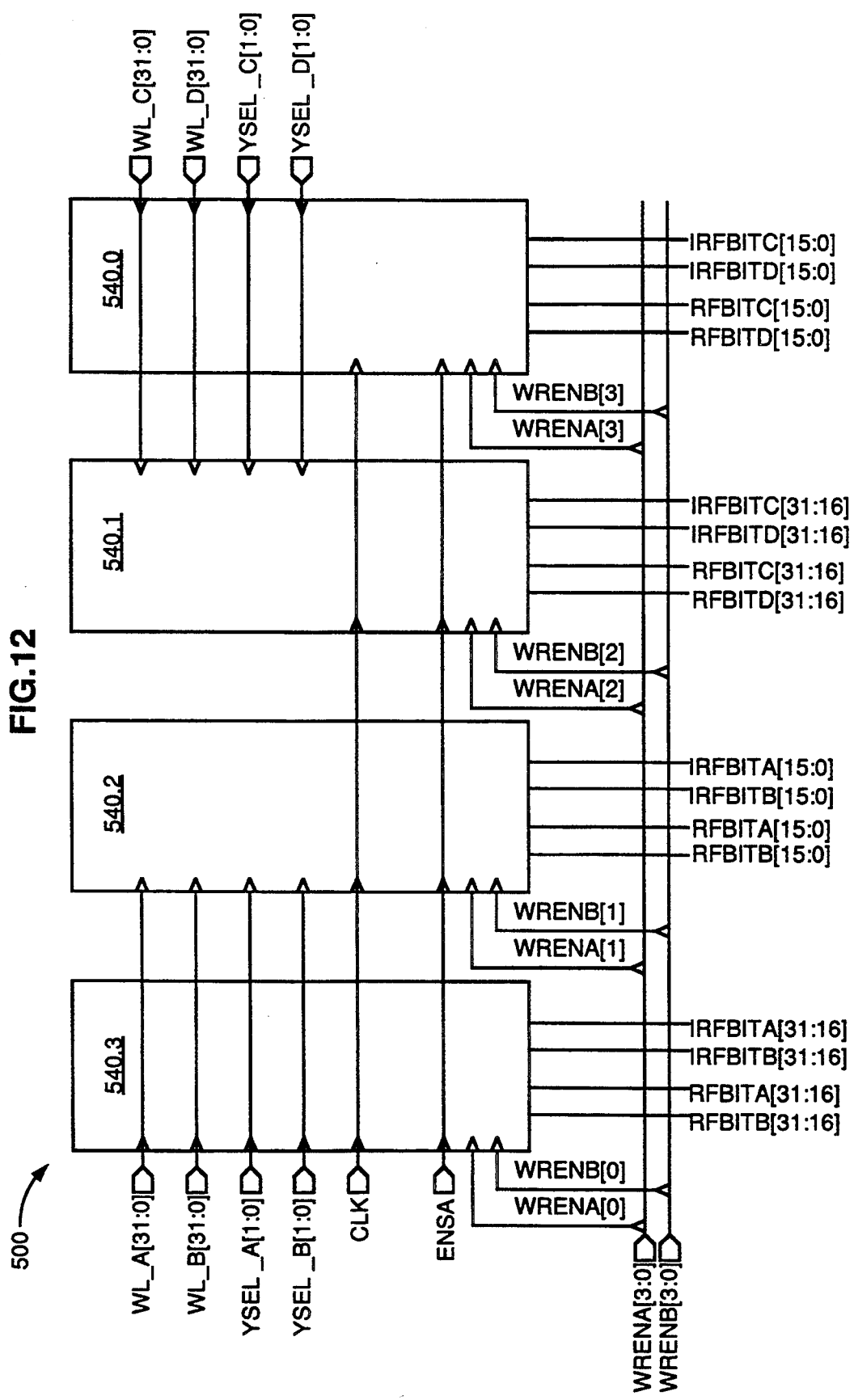
FIG. 12 is a block schematic diagram of a portion of the RF memory of FIG. 11.

An illustrative RF memory 134 is shown in FIGS. 11 and 12. RF memory 134 (FIG. 11) includes a SRAM memory array 500 configured as four banks of 64×16 bit memory as generally described above in text accompanying FIG. 8 and as more particularly identified in FIG. 12 as banks 540.3-540.0. Each of the banks 540 is independently operable as a numerical quantity in a datapath operation. This arrangement accommodates a 16×16 DCT or an 8×8 DCT with multiple quantizer matrices. Pixel data is loaded into the RF memory word by word, with each block being equally divided among the four banks 540.3-540.0. The memory cells used in array 500 are of any suitable type designed to be read and written over separate bit lines. The SRAM memory 500 also includes suitable precharge circuits, bias drivers, decoders, and latches (not shown), suitable circuits for which are generally well known in the art.

The RF memory 134 is addressed by address generator 120 over four six bit address buses carrying, respectively, port A address RFADRA [5:0], port B address RFADRB [5: 0], port C address RFADRC [5:0], and port D address RFADRD [5:0]. Each of the banks 540.3-540.0 is implemented as two banks (not shown) of 32×16 bit memory. The address fields of RFADRA are RFADRA [5:1], which selects one of the 32 addressable words of bank 540.3 and bank 540.2 over one of the word lines WL A [31:0], and RFADRA [0], which selects sub-banks of banks 540.3 and 540.2 over Y-select line YSEL A [1:0]. The address fields of RFADRB are RFADRB [5:1], which selects one of the 32 addressable words of bank 540.3 and bank 540.2 over one of the word lines WLB [31:0 ]; and RFADRB [0], which selects sub-banks of the banks 540.3 and 540.2 over Y-select line YSEL_B [1:0]. The address fields of RFADRC are RFADRC [5:1], which selects one of the 32 addressable words of bank 540.1 and bank 540.0 over one of the word lines WLC [31:0], and RFADRC [0], which selects sub-banks of the banks 540.1 and 540.0 over Y-select line YSEL_C [1:0]. The address fields of RFADRD are RFADRD [5:1], which selects one of the 32 addressable words of bank 540.1 and bank 540.0 over one of the word lines WLD [31:0], and RFADRD [0], which selects sub-banks of the banks 540.1 and 540.0 over Y-select line YSEL_D [1:0].

I/O access to RF memory 134 is a 16-bit read from RFBITA[31:16], RFBITB[15:0], RFBITC[31:16] or RFBITD[15:0]; a 16-bit write to IRFBITB[31:16], IRF-BITB[15:0], IRFRITD[31:16] OR IRFBITD[15:0]; and a 64-bit write of 4×16 bits to IRFBITB[31:16], IRF-BITB[15:0], IRFBITD[31:16] and IRFBITD[15:0]. Datapath access to RF memory 134 is a 128-bit read from RFBITA[31:0], RFBITB[31:0], RFBITC[31:0] and RFBITD[31:0], and a 128-bit write to IRF-BITA[31:0], IRFBITB[31:0], IRFBITC[31:0] and IRF-BITD[31:0].

The RF memory 134 also includes write buffer enable circuits 524 and 526, timer circuit 528, and a precharge circuit, suitable circuits for which are generally well known in the art.

Figure 13:
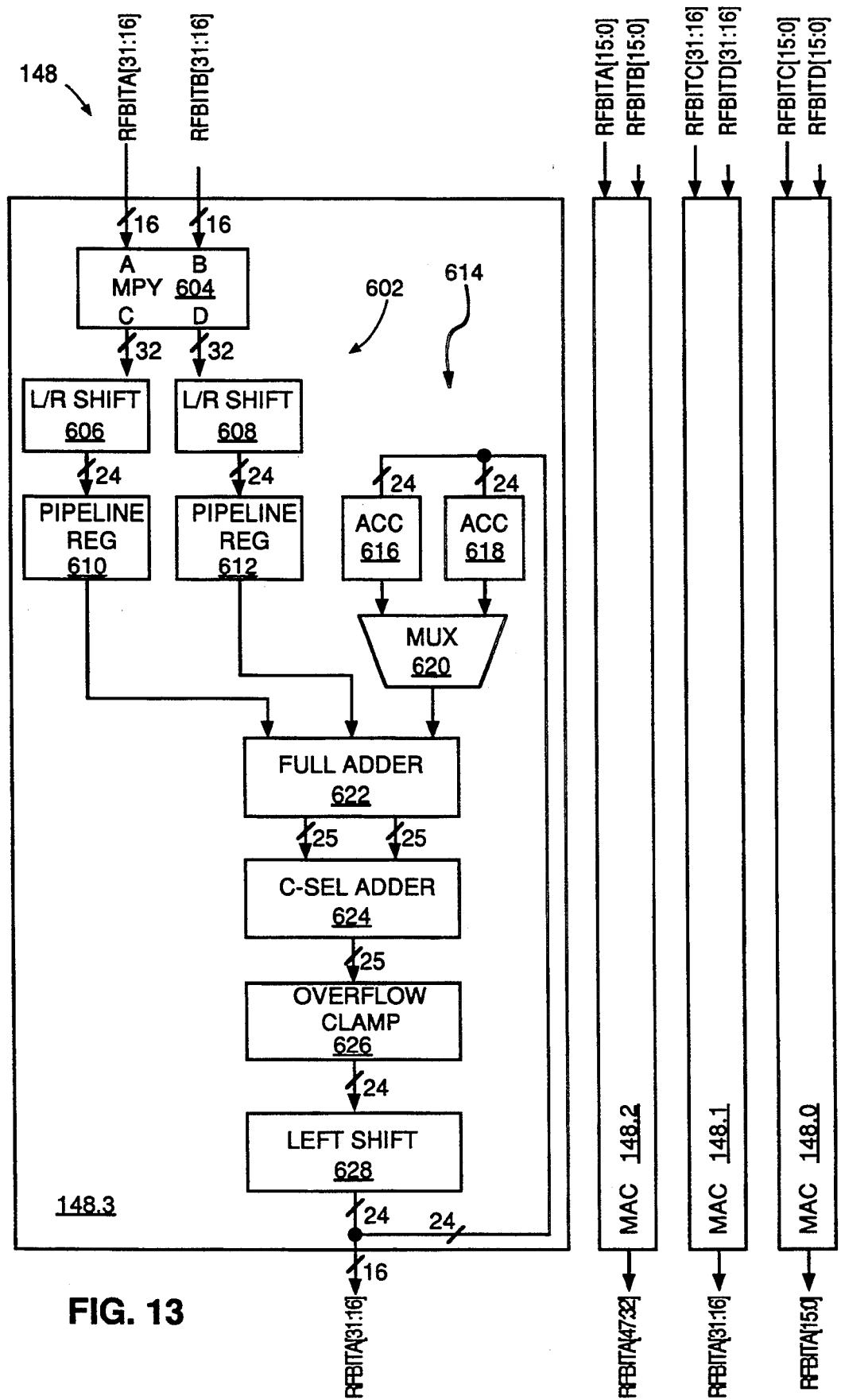
FIG. 13 is a block schematic diagram of a multiplier-accumulator unit useful in the datapath of the vision processor of FIG. 4.

An illustrative multiplier-accumulator ("MAC") 148 is shown in FIG. 13. The MAC 148 is organized as four MAC units 148.3-148.0, each of the units 148.3-148.0 being independent and associated with a respective one of the banks 134.3-134.0 of the RF memory 134. The multiplier accumulator 148.3 receives two 16 bit input operandi from the read ports of bank 134.3, which correspond to RFBITA[31:16] and RFBITB[31:16]. Similarly, MAC 148.2 receives two 16 bit input operandi from the read ports of bank 134.2, which correspond to RFBITA[15:0] and RFBITB[15:0]; MAC 148.1 receives two 16 bit input operandi from the read ports of bank 134.1, which correspond to RFBITC[31:16] and RFBITD[31:16]; and MAC 148.0 receives two 16 bit input operandi from the read ports of bank 134.0, which correspond to RFBITC[15:0] and RFBITD[15:0]. Alternatively, one operand of each of the MACs 148 may be provided by a 16-bit field furnished under microcode instruction from register 145 (FIG. 4B).

As MAC units 148.3-148.0 are substantially identical, only MAC unit 148.3 is described in detail in FIG. 13. The two 16 bit operandi A and B are multiplied in a multiplication branch of the MAC 148.3, indicated generally at 602. The branch 602 includes a 16×16 multiplier array 604, which furnishes a 32 bit intermediate sum and a 32 bit intermediate carry in carry-save add ("CSA") format. The sum and carry from the multiplier array 604 are placed into respective shift registers 606 and 608. Shift registers 606 and 608 shift from zero to eight bits to the left or zero to seven bits (with sign bit extension) to the right under microcode control, for the purpose of prescaling the result before adding the carry to the sum. While an adder and single shift register could be used at this point in the circuit, the preferred arrangement saves chip space since two shift registers require less space than an adder and single shift register. The prescaled sum and carry are furnished to full adder 622 through pipeline registers 610 and 612.

Full adder 622 is provided to sum the result A*B with the output of an accumulator branch, identified generally at 614. The branch 614 includes 24-bit registers, or accumulators, 616 and 618, one of the outputs of which is selected by multiplexer 620 and furnished to the full adder 622 along with the carry and sum outputs of the multiplication branch 602. One of the accumulators 616 and 618 is used as a normal hold register for the previously generated value, while the other of the accumulators 616 and 618 is used to store a number frequently used in the current MAC operation. Since full adder 622 is present, and since a three operandi full adder configuration is similar to a two operandi full adder configuration and requires significantly less layout area than a second full adder, a second full adder at the output of the multiplier array 604 is advantageously avoided. Moreover, only one full adder delay rather than two full adder delays are encountered. The full adder 622 performs a 3:2 compression of the inputs, which are furnished in carry-sum format to a carry-select adder 624 to obtain a real 25-bit resultant.

The output of the carry-select adder 624 is clamped in clamp 626 to a 24 bit maximum numbers (0×7fffff or 0×800000) if overflow, or can be set to be clamped at 16 bit precision if desired. Hence, the selective clamping of the results of MAC operations to meet the dynamic range specification of different signal processing standards is supported. The 24-bit clamped value is furnished to a shifter 628, which is capable of shifting from zero to eight bits left and zero filling to the lowest significant bit. The use of shifter 628 combined with the overflow clamp 626 allows clamping to essentially any precision. The whole 24 bit result is written back to a selected one of the first and second accumulators, and the 16 most significant bits are written back to the RF memory 134 as RFBITA[31:16].

The arrangement of the illustrative multiplier-accumulator 148.3 shown in FIG. 13 is particularly advantageous for discrete cosine transform operations. DCT operations require a great deal of scaling of both multiplied and summed values. This scaling is provided in the shift registers 606 and 608 and in the shift register 628, respectively, under microcode control. DCT operations also require frequent rounding to maintain accuracy. Programmed rounding is accommodated in the MAC 148.3 through the use of the two accumulators 616 and 618, one of which is preloaded under microcode control through the data path of the MAC 148.3 with the presently desired rounding value and maintained through many multiply-accumulate operations, and the other of which is loaded under microcode control with the current result from the shift register 628. DCT operations also benefit from programmable clamping levels and from the ability to select between symmetrical and unsymmetrical clamping, which is accommodated by the overflow clamp 626 operating under microcode control.

The use of pipeline registers 610 and 612 in the MAC 148.3 provides yet another advantage for the vision processor 100. Because of the presence of the pipeline registers 610 and 612, the write-back of the result of DCT operations to the RF memory 134 is delayed. Hence, the original data remains available for one address cycle, and is advantageously accessible by the vision processor 100 for performing an immediately following arithmetic operation. For example, frequently the DCT calculation will involve the operation A+B followed by an operation such as A*X.

Figure 14:
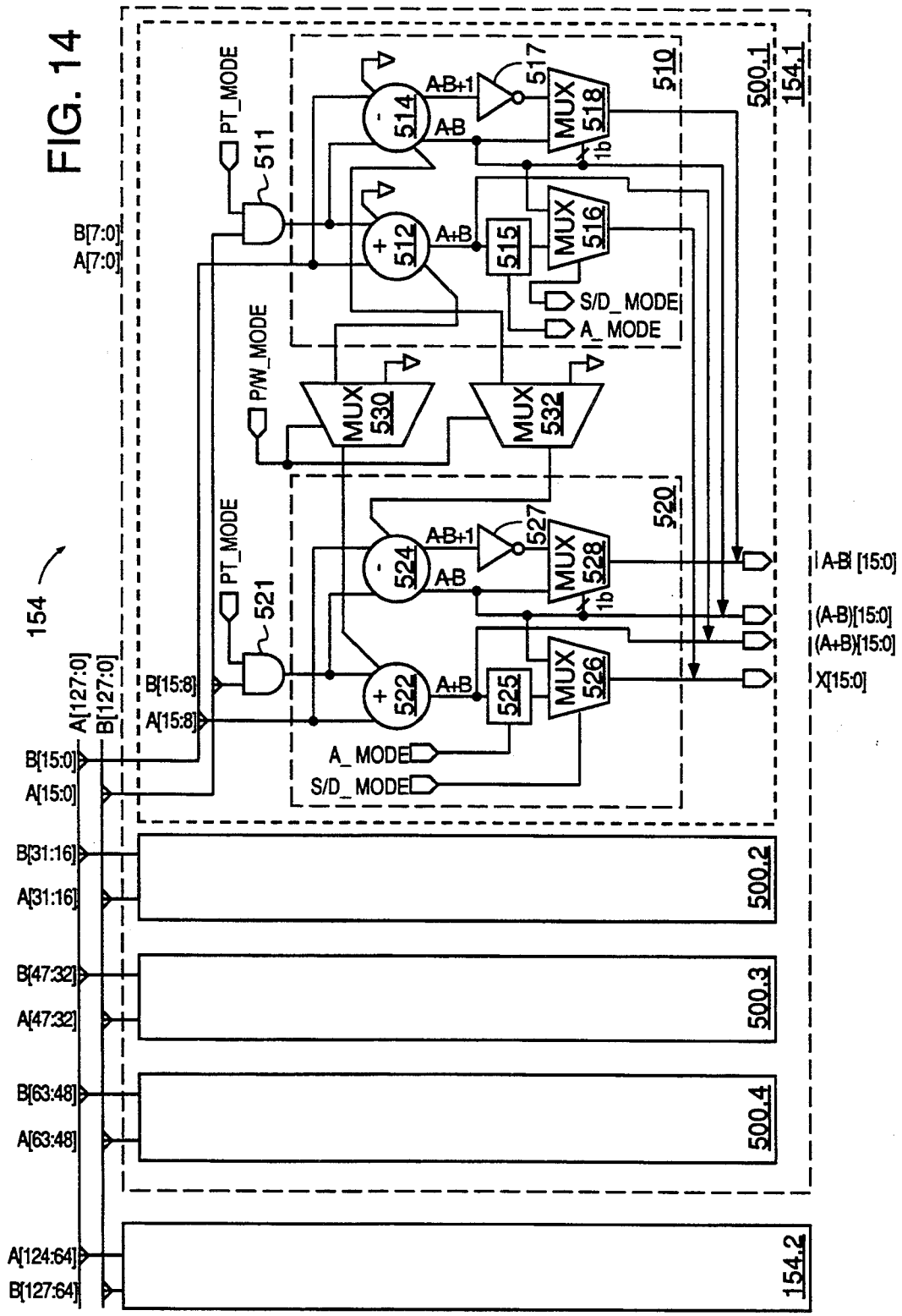
FIG. 14 is a block schematic diagram of an arithmetic logic unit useful in the datapath of the vision processor of FIG. 4.

An illustrative ALU 154 is illustrated in FIG. 14. Generally, ALU 154 performs addition, subtraction or averaging of two operandi A and B in one cycle. The addition is performed to either 16 or 8 bit precision, depending on whether the operandi consist of sixteen eight-bit data items (pixels), or eight sixteen-bit data items (words). The ALU 154 is laid out as two similar 8-pixel or 4-word ALU sections 154.1 and 154.2, which are essentially identical. Each of the ALU sections 154.1 and 154.2 comprises four essentially identical configurable ALU units; as shown in FIG. 14, ALU section 154.1 comprises ALU units 500.1, 500.2, 500.3 and 500.4. The units 500 are substantially identical to one another; a representative unit 500.1 is shown in detail.

The unit 500.1 comprises two arithmetic units 510 and 520. The arithmetic unit 510 comprises a full adder 512 for determining a sum of the pixels A[7:0] and B[7:0], and a full subtractor 514 for determining a difference of the pixels A[7:0] and B[7:0] and the difference plus one. The difference plus one output of the subtractor 514 is inverted by inverter 517, and applied along with the difference output to the multiplexer 518. Either the difference or the inverted difference plus one is selected in accordance with the sign bit on the difference output of the subtractor 514, and the selected quantity is provided as the absolute difference output |A−B|[7:0]. The output of the adder 512 is furnished to circuit 515, which is a shifter that operates either as a pass through circuit or as a divide by two circuit depending on the state of the averaging mode signal A_MODE. The output of the circuit 515 is applied along with the (A−B) output of the subtractor 514 as inputs to multiplexer 516, which selects one of the inputs in accordance with the state of the sum/difference mode signal S/D_MODE. Hence, output X furnishes either (A+B)[7:0], (A−B)[7:0], or (A+B)/2[7:0]. Suitable circuits for the various adders, multiplexers and shifters of FIG. 14 are generally well known in the art.

The elements of arithmetic unit 520 are analogous to the elements of the arithmetic unit 510, except that the adder 522 of the arithmetic unit 520 receives through multiplexer 530 an input from the carry out of the adder 512 in the arithmetic unit 510, and the subtractor 524 of the arithmetic unit 520 receives through multiplexer 532 an input from the carry out of the subtractor 514 in the arithmetic unit 510. In pixel mode, each of the arithmetic units 510 and 520 operate independently. Multiplexers 530 and 532 are responsive to the state of the pixel/word mode bit P/W—MODE to select a logic ZERO for application as the carry to the full adder 522 and the full subtractor 524. In word mode, the arithmetic units 510 and 520 are linked. Multiplexers 530 and 532 are responsive to the state of the pixel/word mode bit P/W_MODE to select the carry output of the full adder 512 for application to the carry input of the full adder 522, and to select the carry output of the full subtractor 514 for application to the carry input of the full subtractor 524.

The outputs of the arithmetic sections 510 and 520 are combined to furnish outputs X[15:0], |A−B|[15:0], (A+B)[15:0] and (A−B)[15:0 ] of the ALU unit 500.1. The outputs of all ALU units in the sections 154.1 and 154.2 are combined to furnish outputs X[127:0], |A−B|[127:0], (A+B)[127:0] and (A−B)[127:0] of the ALU 154.

Another mode supported by the ALU 154 is a pass through mode. The pass through mode essentially sets operand B to zero so that the operand A is unaffected by any arithmetic operations. Pass-through mode is implemented in the ALU unit 500.1 with AND gates 511 and 521, which are responsive to the pass-through mode bit PT_MODE, in the bit lines B[7:0] and B[15:8].

The tree adder 156 (FIG. 4) is used to perform the summation of the difference of 16 pixels at one time received from ALU 154. Tree adders are well known in the art. The output of the tree adder 156 is read by the controller 102 and stored in register RR24.

While the invention has been described with respect to the embodiments set forth above, other embodiments and variations not described herein may be within the scope of the invention. For example, the invention is advantageous fabricated with any suitable 1 micron CMOS process, although it is not to be considered limited to any particular fabrication technology. Generally, the present invention in its broadest terms is not to be considered limited to any particular memory size, bank arrangement, pixel size, word size, or pixel group size, as specific values depend on the characteristics desired of the architecture. Accordingly, other embodiments, variations and improvements not described herein may be within the scope of the invention, which is defined by the following claims.

What is claimed is:

1. A vision processor, comprising:
an image memory having two read ports and a write port;
a block prediction error memory having two read ports and a write port;
a discrete cosine transform ("DCT") memory configurable as a two read, two write port memory and as a four read, four write port memory;
a shifter having an input coupled to a read port of said search memory, and an output;
a shifter/transposer having an input selectively coupled to one of the other read port of said search memory and to two read ports of said DCT memory configured as a two read, two write port memory;
an arithmetic logic unit having:
a first input selectively coupled to one of the two read ports of said frame memory, to the output of said shifter, and to two read ports of said DCT memory configured as a four read, four write port memory, and
a second input selectively coupled to one of the outputs of said shifter and said shifter/transposer, to the output of said shifter/transposer, and to the other two read ports of said DCT memory configured as a four read, four write port memory; and
an output selectively configurable as an average of operandi and a difference of operandi coupled to the write ports of said image memory and block/prediction error memory;
an output configured as an absolute difference of operandi; and
an output configured as a sum of operandi and a difference of operandi coupled to the write ports of said DCT memory;
a tree adder having an input coupled to the absolute difference output of said arithmetic logic unit; and
a multiplier-accumulator having an input coupled to the four read ports of said DCT memory configured as a four read, four write port memory.

2. A vision processor as in claim 1 further comprising a multiplexer having an output coupled to the input of said shifter/transposer and one pair of inputs, one of the inputs being coupled to the other read port of said search memory, and another of the inputs being coupled to the two read ports of said DCT memory.

3. A vision processor as in claim 1 further comprising a multiplexer having an output coupled to the input of said arithmetic logic unit and three pairs of inputs; one input of said first input pair being coupled to the two read ports of said block/prediction error memory, and another input of said first input pair being coupled to the outputs of said shifter and said shifter/transposer; one input of said second input pair being coupled to the output of said shifter, and another input of said second input pair being coupled to the output of said shifter/transposer; and one input of said third input pair being coupled to the two read ports of said DCT memory configured as a four read, four write port memory, and another input of said third input pair being coupled to the two read ports of said DCT memory configured as a four read, four write port memory.

4. A vision processor comprising:
  a first memory for storing image blocks during motion estimation operations, intermediate blocks during interpolation operations, and image blocks and prediction error data during DCT computation operations;
  a second memory for storing a search window;
  a third memory for storing pixel data and DCT coefficient data during intraframe conversion operations, a quantizer matrix during multiple quantization operations, and pixel data during general filter computation operations;
  a DCT transform unit coupled to an output of the third memory for receiving pixel data, and coupled to an input of the third memory for writing DCT coefficients for the received pixel data thereto;
  a quantization unit coupled to an output of the third memory for receiving DCT coefficients and a quantizer matrix, and coupled to an input of the third memory for writing quantized levels for the received DCT coefficients thereto;
  a motion estimation unit coupled to outputs of the first and second memories for receiving a image block and a search window, respectively, and coupled to an input of the second memory for writing a best match block thereto;
  a prediction error unit coupled to outputs of the first and second memories for receiving an image block and a best match block, respectively, and coupled to an input of the first memory for writing prediction error data thereto; and
  an interpolation unit coupled to an output of the first memory for receiving intermediate blocks during the interpolation operations, and coupled to an input of the first memory for writing interpolated blocks thereto.

5. A vision processor as in claim 4 wherein the DCT transform unit comprises a transposer, an arithmetic logic unit, and a multiplier-accumulator.

6. A vision processor as in claim 4 wherein the quantization unit comprises a transposer, an arithmetic logic unit, and a multiplier-accumulator.

7. A vision processor as in claim 4 wherein the motion estimation unit comprises a shifter and an arithmetic logic unit.

8. A vision processor as in claim 4 wherein the prediction error unit comprises an arithmetic logic unit.

9. A vision processor as in claim 4 wherein the interpolation unit comprises a shifter and an arithmetic logic unit.

* * * * *